(12) United States Patent
Kheradpir et al.

(10) Patent No.: US 7,903,796 B1
(45) Date of Patent: Mar. 8, 2011

(54) METHOD AND APPARATUS FOR UNIFIED COMMUNICATION MANAGEMENT VIA INSTANT MESSAGING

(75) Inventors: Shaygan Kheradpir, Waban, MA (US); Shadman Zafar, Irving, TX (US); Fariborz Ebrahimi, Irving, TX (US); Ashequs Samad, Irving, TX (US); M. Reza Ghaffari, Chestnut Hill, MA (US); Renu Chipalkatti, Lexington, MA (US); Alin D'Silva, Waltham, MA (US); Jeffrey M. Getchius, Cambridge, MA (US); Mahesh Rajagopalan, Irving, TX (US); Kevin Trottier, Dallas, TX (US)

(73) Assignee: Verizon Data Services LLC, Temple Terrace, FL (US)

( * ) Notice: Subject to any disclaimer, the term of this patent is extended or adjusted under 35 U.S.C. 154(b) by 0 days.

(21) Appl. No.: 10/083,822

(22) Filed: Feb. 27, 2002

Related U.S. Application Data

(60) Provisional application No. 60/276,505, filed on Mar. 19, 2001, provisional application No. 60/275,031, filed on Mar. 13, 2001, provisional application No. 60/275,020, filed on Mar. 13, 2001, provisional application No. 60/275,719, filed on Mar. 13, 2001, provisional application No. 60/275,667, filed on Mar. 13, 2001, provisional application No. 60/272,167, filed on Feb. 27, 2001, provisional application No. 60/272,122, filed on Feb. 27, 2001.

(51) Int. Cl.
*H04M 11/06* (2006.01)

(52) U.S. Cl. .................. 379/88.17; 379/201.01; 455/466; 709/206

(58) Field of Classification Search ............... 379/88.17, 379/201.01, 201.03, 201.04, 201.12, 244, 379/352; 370/254; 709/220–229, 217–219, 238–244, 247–253, 206; 455/466
See application file for complete search history.

(56) References Cited

U.S. PATENT DOCUMENTS

| | | | |
|---|---|---|---|
| 4,013,839 | A | 3/1977 | Bell |
| 4,540,850 | A | 9/1985 | Herr et al. |
| 4,600,814 | A | 7/1986 | Cunniff et al. |
| 4,734,931 | A | 3/1988 | Bourg et al. |
| 4,924,496 | A | 5/1990 | Figa et al. |
| 5,014,303 | A | 5/1991 | Velius |
| 5,168,515 | A | 12/1992 | Gechter et al. |
| 5,222,125 | A | 6/1993 | Creswell et al. |
| 5,274,700 | A | 12/1993 | Gechter et al. |

(Continued)

FOREIGN PATENT DOCUMENTS
CA      2240878      12/1998

(Continued)

OTHER PUBLICATIONS

"MP3 Recorder Download—MP3 Recorder—Record Audio Stream to MP3 or WAV," 2002, http://www.mp3-recorder.net.

(Continued)

*Primary Examiner* — Gerald Gauthier

(57) ABSTRACT

Methods and apparatus for a unified communications manager via instant messaging are provided. In particular, a user may interface with a user service center to use applications via an instant messaging service to manage various aspects of their communications such as their phone calls, voice mail, email, and instant messages. A user may also manage their contact information and profile, such as rules for how calls are forwarded to the user. Thus, a user is provided a unified communications manager to implement rules and conditions across a wide variety of devices and networks.

18 Claims, 21 Drawing Sheets

U.S. PATENT DOCUMENTS

| | | | |
|---|---|---|---|
| 5,327,486 A | 7/1994 | Wolff et al. |
| 5,329,578 A | 7/1994 | Brennan et al. |
| 5,428,663 A | 6/1995 | Grimes et al. |
| 5,440,624 A | 8/1995 | Schoof |
| 5,483,586 A | 1/1996 | Sussman |
| 5,533,096 A | 7/1996 | Bales |
| 5,535,265 A | 7/1996 | Suwandhaputra |
| 5,550,907 A | 8/1996 | Carlsen |
| 5,583,564 A | 12/1996 | Rao et al. |
| 5,586,173 A | 12/1996 | Misholi et al. |
| 5,588,037 A | 12/1996 | Fuller et al. |
| 5,608,788 A | 3/1997 | Demlow et al. |
| 5,619,555 A | 4/1997 | Fenton et al. |
| 5,621,787 A | 4/1997 | McKoy et al. |
| 5,623,541 A | 4/1997 | Boyle et al. |
| 5,631,904 A | 5/1997 | Fitser et al. |
| 5,638,434 A | 6/1997 | Gottlieb et al. |
| 5,652,789 A | 7/1997 | Miner et al. |
| 5,661,788 A | 8/1997 | Chin |
| 5,668,863 A | 9/1997 | Bieselin et al. |
| 5,673,080 A | 9/1997 | Biggs et al. |
| 5,692,213 A | 11/1997 | Goldberg et al. |
| 5,710,591 A | 1/1998 | Bruno et al. |
| 5,715,444 A | 2/1998 | Danish et al. |
| 5,717,863 A | 2/1998 | Adamson et al. |
| 5,719,925 A | 2/1998 | Peoples |
| 5,724,412 A | 3/1998 | Srinivasan |
| 5,742,095 A | 4/1998 | Bryant et al. |
| 5,742,668 A | 4/1998 | Pepe et al. |
| 5,742,905 A | 4/1998 | Pepe et al. |
| 5,745,561 A | 4/1998 | Baker et al. |
| 5,747,970 A | 5/1998 | Johnson, Jr. et al. |
| 5,751,800 A | 5/1998 | Ardon |
| 5,752,191 A | 5/1998 | Fuller et al. |
| 5,764,901 A | 6/1998 | Skarbo et al. |
| 5,805,607 A | 9/1998 | Khu |
| 5,805,670 A | 9/1998 | Pons et al. |
| 5,841,837 A | 11/1998 | Fuller et al. |
| 5,864,603 A | 1/1999 | Haavisto et al. |
| 5,872,841 A | 2/1999 | King et al. |
| 5,875,242 A * | 2/1999 | Glaser et al. ............ 379/201.05 |
| 5,875,437 A | 2/1999 | Atkins |
| 5,903,845 A | 5/1999 | Buhrmann et al. |
| 5,907,324 A | 5/1999 | Larson et al. |
| 5,907,547 A | 5/1999 | Foladare et al. |
| 5,917,817 A | 6/1999 | Dunn et al. |
| 5,917,912 A | 6/1999 | Ginter et al. |
| 5,920,826 A | 7/1999 | Metso et al. |
| 5,920,847 A | 7/1999 | Kolling et al. |
| 5,926,535 A | 7/1999 | Reynolds |
| 5,944,769 A | 8/1999 | Musk et al. |
| 5,945,989 A | 8/1999 | Freishtat et al. |
| 5,963,925 A | 10/1999 | Kolling et al. |
| 5,982,870 A | 11/1999 | Pershan et al. |
| 6,005,870 A | 12/1999 | Leung et al. |
| 6,018,571 A | 1/2000 | Langlois et al. |
| 6,018,737 A | 1/2000 | Shah et al. |
| 6,021,428 A | 2/2000 | Miloslavsky |
| 6,029,151 A | 2/2000 | Nikander |
| 6,031,896 A | 2/2000 | Gardell et al. |
| 6,041,103 A | 3/2000 | La Porta et al. |
| 6,052,372 A | 4/2000 | Gittins et al. |
| 6,058,163 A | 5/2000 | Pattison et al. |
| 6,061,432 A | 5/2000 | Wallace et al. |
| 6,092,102 A | 7/2000 | Wagner |
| 6,100,882 A | 8/2000 | Sharman et al. |
| 6,122,348 A | 9/2000 | French-St. George et al. |
| 6,134,318 A | 10/2000 | O'Neil |
| 6,134,548 A | 10/2000 | Gottsman et al. |
| 6,144,671 A | 11/2000 | Perinpanathan et al. |
| 6,154,646 A | 11/2000 | Tran et al. |
| 6,161,008 A | 12/2000 | Lee et al. |
| 6,163,692 A | 12/2000 | Chakrabarti et al. |
| 6,167,119 A | 12/2000 | Bartholomew et al. |
| 6,188,756 B1 | 2/2001 | Mashinsky |
| 6,189,026 B1 | 2/2001 | Birrell et al. |
| 6,192,123 B1 | 2/2001 | Grunsted et al. |
| 6,195,660 B1 | 2/2001 | Polnerow et al. |
| 6,215,863 B1 | 4/2001 | Bennett et al. |
| 6,219,413 B1 | 4/2001 | Burg |
| 6,226,374 B1 | 5/2001 | Howell et al. |
| 6,240,449 B1 | 5/2001 | Nadeau |
| 6,260,050 B1 | 7/2001 | Yost et al. |
| 6,275,575 B1 | 8/2001 | Wu |
| 6,282,522 B1 | 8/2001 | Davis et al. |
| 6,289,062 B1 | 9/2001 | Wang et al. |
| 6,298,129 B1 | 10/2001 | Culver et al. |
| 6,301,338 B1 | 10/2001 | Makela et al. |
| 6,301,609 B1 | 10/2001 | Aravamudan et al. |
| 6,310,947 B1 | 10/2001 | Polcyn |
| 6,324,269 B1 | 11/2001 | Malik |
| 6,333,973 B1 | 12/2001 | Smith et al. |
| 6,349,299 B1 | 2/2002 | Spencer et al. |
| 6,351,279 B1 | 2/2002 | Sawyer |
| 6,363,143 B1 | 3/2002 | Fox |
| 6,371,484 B1 | 4/2002 | Yuan |
| 6,373,930 B1 | 4/2002 | McConnell et al. |
| 6,385,754 B1 * | 5/2002 | Mizumoto et al. ............ 714/800 |
| 6,408,191 B1 | 6/2002 | Blanchard et al. |
| 6,408,327 B1 | 6/2002 | McClennon et al. |
| 6,411,605 B1 | 6/2002 | Vance et al. |
| 6,389,113 B1 | 7/2002 | Silverman |
| 6,418,214 B1 | 7/2002 | Smythe et al. |
| 6,430,176 B1 | 8/2002 | Christie |
| 6,430,289 B1 | 8/2002 | Liffick |
| 6,434,226 B1 | 8/2002 | Takahashi |
| 6,442,245 B1 | 8/2002 | Castagna et al. |
| 6,442,251 B1 | 8/2002 | Maes et al. |
| 6,442,748 B1 | 8/2002 | Bowman-Amuah |
| 6,453,031 B2 | 9/2002 | Malik |
| 6,453,167 B1 | 9/2002 | Michaels et al. |
| 6,459,780 B1 | 10/2002 | Wurster et al. |
| 6,459,913 B2 | 10/2002 | Cloutier |
| 6,463,145 B1 * | 10/2002 | O'Neal et al. ............ 379/211.02 |
| 6,463,464 B1 | 10/2002 | Lazaridis et al. |
| 6,466,910 B1 | 10/2002 | Desmond et al. |
| 6,470,079 B1 | 10/2002 | Benson |
| 6,473,615 B1 | 10/2002 | Theppasandra et al. |
| 6,477,374 B1 | 11/2002 | Shaffer et al. |
| 6,480,830 B1 | 11/2002 | Ford et al. |
| 6,480,890 B1 | 11/2002 | Lee, Jr. et al. |
| 6,507,644 B1 | 1/2003 | Henderson et al. |
| 6,519,326 B1 | 2/2003 | Milewski et al. |
| 6,522,734 B1 | 2/2003 | Allen et al. |
| 6,526,134 B1 | 2/2003 | Wallenius |
| 6,532,285 B1 | 3/2003 | Tucker et al. |
| 6,535,596 B1 | 3/2003 | Frey et al. |
| 6,539,082 B1 | 3/2003 | Lowe et al. |
| 6,542,596 B1 | 4/2003 | Hill et al. |
| 6,546,005 B1 | 4/2003 | Berkley et al. |
| 6,547,830 B1 | 4/2003 | Mercer |
| 6,560,329 B1 | 5/2003 | Draginich et al. |
| 6,563,914 B2 | 5/2003 | Sammon et al. |
| 6,564,261 B1 * | 5/2003 | Gudjonsson et al. ......... 709/227 |
| 6,574,324 B1 | 6/2003 | Malik |
| 6,574,470 B1 | 6/2003 | Chow et al. |
| 6,577,622 B1 | 6/2003 | Schuster et al. |
| 6,577,720 B1 | 6/2003 | Sutter |
| 6,584,122 B1 * | 6/2003 | Matthews et al. ............. 370/493 |
| 6,590,603 B2 | 7/2003 | Sheldon et al. |
| 6,590,969 B1 | 7/2003 | Peters et al. |
| 6,594,352 B1 | 7/2003 | Smith |
| 6,594,470 B1 | 7/2003 | Barnes et al. |
| 6,600,736 B1 | 7/2003 | Ball et al. |
| 6,609,113 B1 | 8/2003 | O'Leary et al. |
| 6,611,590 B1 | 8/2003 | Lu et al. |
| 6,614,786 B1 | 9/2003 | Byers |
| 6,618,710 B1 * | 9/2003 | Zondervan et al. ............. 706/11 |
| 6,625,258 B1 | 9/2003 | Ram et al. |
| 6,628,194 B1 | 9/2003 | Hellebust et al. |
| 6,628,770 B1 | 9/2003 | Jain et al. |
| 6,636,587 B1 | 10/2003 | Nagai et al. |
| 6,643,356 B1 | 11/2003 | Hickey et al. |
| 6,654,768 B2 | 11/2003 | Celik |
| 6,661,340 B1 | 12/2003 | Saylor et al. |
| 6,665,388 B2 | 12/2003 | Bedingfield |
| 6,668,046 B1 | 12/2003 | Albal |

| Patent No. | Date | Inventor |
|---|---|---|
| 6,668,049 B1 | 12/2003 | Koch et al. |
| 6,681,119 B1 * | 1/2004 | Verdonk .................. 455/555 |
| 6,683,939 B1 | 1/2004 | Chiloyan et al. |
| 6,687,362 B1 | 2/2004 | Lindquist et al. |
| 6,690,672 B1 | 2/2004 | Klein |
| 6,693,897 B1 | 2/2004 | Huang |
| 6,697,461 B1 | 2/2004 | Middleswarth et al. |
| 6,697,796 B2 | 2/2004 | Kermani |
| 6,704,294 B1 | 3/2004 | Cruickshank |
| 6,711,158 B1 | 3/2004 | Kahane et al. |
| 6,717,938 B1 | 4/2004 | D'Angelo |
| 6,718,026 B1 | 4/2004 | Pershan et al. |
| 6,718,178 B1 | 4/2004 | Sladek et al. |
| 6,724,887 B1 | 4/2004 | Eilbacher et al. |
| 6,731,238 B2 | 5/2004 | Johnson |
| 6,735,292 B1 | 5/2004 | Johnson |
| 6,738,458 B1 * | 5/2004 | Cline et al. ............ 379/88.18 |
| 6,748,054 B1 | 6/2004 | Gross et al. |
| 6,757,365 B1 | 6/2004 | Bogard |
| 6,768,788 B1 | 7/2004 | Langseth et al. |
| 6,768,790 B1 * | 7/2004 | Manduley et al. ...... 379/88.13 |
| 6,771,949 B1 | 8/2004 | Corliss |
| 6,775,546 B1 | 8/2004 | Fuller |
| 6,788,772 B2 | 9/2004 | Barak et al. |
| 6,788,775 B1 | 9/2004 | Simpson |
| 6,792,092 B1 | 9/2004 | Michalewicz |
| 6,798,753 B1 | 9/2004 | Doganata et al. |
| 6,801,610 B1 | 10/2004 | Malik |
| 6,807,258 B1 | 10/2004 | Malik |
| 6,807,259 B1 | 10/2004 | Patel et al. |
| 6,816,468 B1 | 11/2004 | Cruickshank |
| 6,816,469 B1 | 11/2004 | Kung et al. |
| 6,820,055 B2 | 11/2004 | Saindon et al. |
| 6,842,460 B1 | 1/2005 | Olkkonen et al. |
| 6,847,823 B2 | 1/2005 | Lehikoinen et al. |
| 6,853,634 B1 | 2/2005 | Davies et al. |
| 6,853,713 B1 | 2/2005 | Fobert et al. |
| 6,856,974 B1 | 2/2005 | Ganesan et al. |
| 6,876,736 B2 | 4/2005 | Lamy et al. |
| 6,882,714 B2 | 4/2005 | Mansfield |
| 6,882,838 B1 | 4/2005 | Lee et al. |
| 6,885,742 B1 | 4/2005 | Smith |
| 6,907,111 B1 | 6/2005 | Zhang et al. |
| 6,917,610 B1 | 7/2005 | Kung et al. |
| 6,944,279 B2 | 9/2005 | Elsey et al. |
| 6,947,538 B2 | 9/2005 | Shen et al. |
| 6,954,521 B2 | 10/2005 | Bull et al. |
| 6,956,942 B1 | 10/2005 | McKinzie et al. |
| 6,958,984 B2 | 10/2005 | Kotzin |
| 6,961,409 B2 | 11/2005 | Kato |
| 6,963,857 B1 | 11/2005 | Johnson |
| 6,970,705 B2 | 11/2005 | Yoshimoto et al. |
| 6,996,227 B2 | 2/2006 | Albal et al. |
| 6,996,370 B2 | 2/2006 | DeLoye et al. |
| 6,999,563 B1 | 2/2006 | Thorpe et al. |
| 7,024,209 B1 | 4/2006 | Gress et al. |
| 7,027,435 B2 | 4/2006 | Bardehle |
| 7,031,437 B1 | 4/2006 | Parsons et al. |
| 7,043,521 B2 | 5/2006 | Eitel |
| 7,065,198 B2 | 6/2006 | Brown et al. |
| 7,068,768 B2 | 6/2006 | Barnes |
| 7,076,528 B2 | 7/2006 | Premutico |
| 7,107,312 B2 | 9/2006 | Hackbarth et al. |
| 7,116,972 B1 | 10/2006 | Zhang et al. |
| 7,130,390 B2 | 10/2006 | Abburi |
| 7,136,461 B1 | 11/2006 | Swingle et al. |
| 7,139,728 B2 | 11/2006 | Rigole |
| 7,139,782 B2 | 11/2006 | Osaki |
| 7,142,646 B2 | 11/2006 | Zafar et al. |
| 7,149,773 B2 | 12/2006 | Haller et al. |
| 7,174,306 B1 | 2/2007 | Haseltine |
| 7,181,417 B1 * | 2/2007 | Langseth et al. ............ 705/26 |
| 7,187,932 B1 | 3/2007 | Barchi |
| 7,190,773 B1 | 3/2007 | D'Silva et al. |
| 7,209,955 B1 | 4/2007 | Major et al. |
| 7,212,808 B2 | 5/2007 | Engstrom et al. |
| 7,245,929 B2 | 7/2007 | Henderson et al. |
| 7,254,220 B1 | 8/2007 | Reding et al. |
| 7,283,808 B2 | 10/2007 | Castell et al. |
| 7,308,087 B2 * | 12/2007 | Joyce et al. ............ 379/114.2 |
| 7,315,614 B2 | 1/2008 | Bedingfield, Sr. et al. |
| 7,379,538 B1 | 5/2008 | Ali et al. |
| 7,418,090 B2 | 8/2008 | Reding et al. |
| 7,428,580 B2 | 9/2008 | Hullfish et al. |
| 2001/0003202 A1 | 6/2001 | Mache et al. |
| 2001/0012286 A1 | 8/2001 | Huna et al. |
| 2001/0014863 A1 | 8/2001 | Williams, III |
| 2001/0017777 A1 | 8/2001 | Maruyama et al. |
| 2001/0025262 A1 | 9/2001 | Ahmed |
| 2001/0025280 A1 | 9/2001 | Mandato et al. |
| 2001/0032181 A1 | 10/2001 | Jakstadt et al. |
| 2001/0039191 A1 | 11/2001 | Maierhofer |
| 2001/0040954 A1 | 11/2001 | Brachman et al. |
| 2001/0043689 A1 | 11/2001 | Malik |
| 2001/0043690 A1 | 11/2001 | Bakshi et al. |
| 2001/0051534 A1 | 12/2001 | Amin |
| 2001/0054066 A1 | 12/2001 | Spitzer |
| 2001/0056466 A1 | 12/2001 | Thompson et al. |
| 2002/0012425 A1 | 1/2002 | Brisebois et al. |
| 2002/0018550 A1 | 2/2002 | Hafez |
| 2002/0022453 A1 | 2/2002 | Balog et al. |
| 2002/0026575 A1 | 2/2002 | Wheeler et al. |
| 2002/0035617 A1 | 3/2002 | Lynch et al. |
| 2002/0040355 A1 | 4/2002 | Weiner |
| 2002/0046299 A1 | 4/2002 | Lefeber |
| 2002/0055351 A1 | 5/2002 | Elsey et al. |
| 2002/0057678 A1 | 5/2002 | Jiang et al. |
| 2002/0069060 A1 | 6/2002 | Cannavo et al. |
| 2002/0069096 A1 | 6/2002 | Lindoerfer et al. |
| 2002/0071539 A1 | 6/2002 | Diament et al. |
| 2002/0073163 A1 | 6/2002 | Churchill et al. |
| 2002/0075303 A1 | 6/2002 | Thompson et al. |
| 2002/0075306 A1 | 6/2002 | Thompson |
| 2002/0076026 A1 | 6/2002 | Batten |
| 2002/0076027 A1 | 6/2002 | Bernnan et al. |
| 2002/0077082 A1 | 6/2002 | Cruickshank |
| 2002/0078153 A1 | 6/2002 | Chung et al. |
| 2002/0080942 A1 | 6/2002 | Clapper |
| 2002/0082028 A1 | 6/2002 | Wittenkamp |
| 2002/0082030 A1 | 6/2002 | Berndt et al. |
| 2002/0083462 A1 | 6/2002 | Arnott |
| 2002/0085515 A1 | 7/2002 | Jaynes et al. |
| 2002/0085687 A1 | 7/2002 | Contractor et al. |
| 2002/0085701 A1 | 7/2002 | Parsons et al. |
| 2002/0100798 A1 | 8/2002 | Farrugia et al. |
| 2002/0103864 A1 | 8/2002 | Rodman et al. |
| 2002/0103898 A1 * | 8/2002 | Moyer et al. .................. 709/224 |
| 2002/0110121 A1 | 8/2002 | Mishra |
| 2002/0115471 A1 | 8/2002 | DeLoye et al. |
| 2002/0137507 A1 | 9/2002 | Winkler |
| 2002/0137530 A1 | 9/2002 | Karve |
| 2002/0138468 A1 | 9/2002 | Kermani |
| 2002/0146105 A1 | 10/2002 | McIntyre |
| 2002/0147777 A1 | 10/2002 | Hackbarth et al. |
| 2002/0147811 A1 | 10/2002 | Schwartz et al. |
| 2002/0152165 A1 | 10/2002 | Dutta et al. |
| 2002/0168055 A1 | 11/2002 | Crockett et al. |
| 2002/0177410 A1 | 11/2002 | Klein |
| 2002/0178117 A1 | 11/2002 | Maguire et al. |
| 2002/0187794 A1 | 12/2002 | Fostick |
| 2003/0014488 A1 | 1/2003 | Dalal et al. |
| 2003/0035381 A1 | 2/2003 | Chen et al. |
| 2003/0036380 A1 | 2/2003 | Skidmore |
| 2003/0045309 A1 | 3/2003 | Knotts |
| 2003/0046071 A1 | 3/2003 | Wyman |
| 2003/0053612 A1 | 3/2003 | Henrikson et al. |
| 2003/0055735 A1 | 3/2003 | Cameron et al. |
| 2003/0055906 A1 | 3/2003 | Packham |
| 2003/0058838 A1 | 3/2003 | Wengrovitz |
| 2003/0069874 A1 | 4/2003 | Hertzog et al. |
| 2003/0083040 A1 | 5/2003 | Ruth et al. |
| 2003/0092451 A1 | 5/2003 | Holloway et al. |
| 2003/0093700 A1 | 5/2003 | Yoshimoto et al. |
| 2003/0096626 A1 | 5/2003 | Sabo et al. |
| 2003/0097635 A1 | 5/2003 | Giannetti |
| 2003/0104827 A1 | 6/2003 | Moran |
| 2003/0108172 A1 | 6/2003 | Petty et al. |
| 2003/0112928 A1 | 6/2003 | Brown et al. |

| | | | |
|---|---|---|---|
| 2003/0119532 A1 | 6/2003 | Hatch | |
| 2003/0140004 A1 | 7/2003 | O'Leary et al. | |
| 2003/0142798 A1 | 7/2003 | Gavette et al. | |
| 2003/0147518 A1 | 8/2003 | Albal et al. | |
| 2003/0149662 A1 | 8/2003 | Shore | |
| 2003/0158860 A1 | 8/2003 | Caughey | |
| 2003/0165223 A1 | 9/2003 | Timmins et al. | |
| 2003/0167229 A1 | 9/2003 | Ludwig et al. | |
| 2003/0169330 A1 | 9/2003 | Ben-Shachar et al. | |
| 2003/0179743 A1 | 9/2003 | Bosik et al. | |
| 2003/0179864 A1 | 9/2003 | Stillman et al. | |
| 2003/0187992 A1 | 10/2003 | Steenfeldt et al. | |
| 2003/0208541 A1 | 11/2003 | Musa | |
| 2003/0217097 A1 | 11/2003 | Eitel | |
| 2003/0228863 A1 | 12/2003 | Vander Veen et al. | |
| 2004/0002350 A1 | 1/2004 | Gopinath et al. | |
| 2004/0019638 A1 | 1/2004 | Makagon et al. | |
| 2004/0034700 A1 | 2/2004 | Polcyn | |
| 2004/0044658 A1 | 3/2004 | Crabtree et al. | |
| 2004/0052356 A1 | 3/2004 | McKinzie et al. | |
| 2004/0081292 A1 | 4/2004 | Brown et al. | |
| 2004/0103152 A1 | 5/2004 | Ludwig et al. | |
| 2004/0119814 A1 | 6/2004 | Clisham et al. | |
| 2004/0127256 A1 | 7/2004 | Goldthwaite et al. | |
| 2004/0156491 A1 | 8/2004 | Reding et al. | |
| 2004/0184593 A1 | 9/2004 | Elsey et al. | |
| 2004/0203942 A1 | 10/2004 | Dehlin | |
| 2004/0208305 A1 | 10/2004 | Gross et al. | |
| 2004/0236792 A1 | 11/2004 | Celik | |
| 2004/0247088 A1 | 12/2004 | Lee | |
| 2004/0249884 A1 | 12/2004 | Caspi et al. | |
| 2004/0264654 A1 | 12/2004 | Reding et al. | |
| 2005/0053221 A1 | 3/2005 | Reding et al. | |
| 2005/0102382 A1 | 5/2005 | MacGregor et al. | |
| 2005/0129208 A1 | 6/2005 | McGrath | |
| 2005/0149487 A1 | 7/2005 | Celik | |
| 2005/0191994 A1 | 9/2005 | May et al. | |
| 2005/0216421 A1 | 9/2005 | Barry et al. | |
| 2005/0220286 A1 | 10/2005 | Valdez et al. | |
| 2005/0243993 A1 | 11/2005 | McKinzie et al. | |
| 2006/0093120 A1 | 5/2006 | Thorpe et al. | |
| 2006/0095575 A1 | 5/2006 | Sureka et al. | |
| 2006/0168140 A1 | 7/2006 | Inoue et al. | |
| 2006/0276179 A1 | 12/2006 | Ghaffari et al. | |
| 2006/0277213 A1 | 12/2006 | Robertson et al. | |
| 2007/0021111 A1 | 1/2007 | Celik | |

FOREIGN PATENT DOCUMENTS

| | | |
|---|---|---|
| DE | 10110942 A1 | 9/2002 |
| EP | 0818908 A3 | 1/1998 |
| EP | 1028578 | 8/2000 |
| EP | 1161063 | 12/2001 |
| EP | 1193617 | 4/2002 |
| EP | 1235387 | 8/2002 |
| JP | 59-169264 | 9/1984 |
| JP | 02-260750 | 10/1990 |
| JP | 04-336742 | 11/1992 |
| JP | 05-316233 | 11/1993 |
| JP | 07-030664 | 1/1995 |
| JP | 07-058856 | 3/1995 |
| JP | 07-107171 | 4/1995 |
| JP | 07-107549 | 4/1995 |
| JP | 07-123098 | 5/1995 |
| JP | 08-149226 | 1/1996 |
| JP | 08-181763 | 7/1996 |
| JP | 08-298546 | 11/1996 |
| JP | 08-331642 | 12/1996 |
| JP | 09-064869 | 3/1997 |
| JP | 09-064977 | 3/1997 |
| JP | 09-083651 | 3/1997 |
| JP | 09-200350 | 7/1997 |
| JP | 09-223087 | 8/1997 |
| JP | 09-294158 | 11/1997 |
| JP | 09-294163 | 11/1997 |
| JP | 10-013546 | 1/1998 |
| JP | 10-051555 | 2/1998 |
| JP | 10-155038 | 6/1998 |
| JP | 10-173769 | 6/1998 |
| JP | 10-336319 | 12/1998 |
| JP | 11-055407 | 2/1999 |
| JP | 11-127222 | 5/1999 |
| JP | 11-136316 | 5/1999 |
| JP | 11-187156 | 7/1999 |
| JP | 11-191800 | 7/1999 |
| JP | 11-266309 | 9/1999 |
| JP | 2000-032116 | 1/2000 |
| JP | 2000-134309 | 5/2000 |
| JP | 2000-165433 | 6/2000 |
| JP | 2000-196756 | 7/2000 |
| JP | 2000-224301 A | 8/2000 |
| JP | 2000-270307 | 9/2000 |
| JP | 2001-144859 | 5/2001 |
| JP | 2001-156921 | 6/2001 |
| JP | 2001-197210 | 7/2001 |
| JP | 2001-197562 | 7/2001 |
| JP | 2001-298545 | 10/2001 |
| JP | 2002-016673 | 1/2002 |
| JP | 2002-044257 | 2/2002 |
| JP | 2002-057807 | 2/2002 |
| JP | 2002-232575 | 8/2002 |
| JP | 2002-237893 | 8/2002 |
| JP | 2002-247148 A | 8/2002 |
| JP | 2002-261834 | 9/2002 |
| JP | 2002-300290 | 10/2002 |
| JP | 2002-300306 | 10/2002 |
| WO | 96/14704 | 5/1996 |
| WO | 99/38309 | 7/1999 |
| WO | 00/45557 | 8/2000 |
| WO | WO 00/64133 | 10/2000 |
| WO | WO 01/11586 A1 | 2/2001 |
| WO | WO 01/35621 | 5/2001 |
| WO | WO 01/52513 | 7/2001 |
| WO | WO 01/89212 | 11/2001 |

OTHER PUBLICATIONS

"Voice-ASP, White Paper Technology & Processes," eVoice, Dec. 13, 2000.

"Voice-ASP, White Paper: Market Opportunities for Enhanced Voicemail," eVoice, Nov. 10, 2000.

"Supplemental Report to Diary 53, Networking the Sound Digitizing Device," Old Colorado City Communications and the National Science Foundation Wireless Field Tests, Oct. 20, 2002, Lansing, Michigan, http://wireless.oldcolo.com/biology/ProgressReports2002/Progress%20Reports2002/53SupplementalReport(10-20-02).htm.

"Chapter 3: Overview," last updated Dec. 2, 1999, http://service.real.com/help/library/guides/g270/htmfiles/overview.htm.

"Telecommunications and Personal Management Services Linked in Collaboration by Verizon and Microsoft," Oct. 23, 2001, http://www.microsoft.com/presspass/press/2001/oct01/10-23MSVerizonPr.asp.

"File Transfer," Microsoft Windows Technologies Windows NetMeeting, last updated Jun. 4, 1999, http://www.microsoft.com/windows/netmeeting/features/files/default.asp.

"From Dial Tone to Media Tone," Analyst: R. Mahowald, IDC, Jun. 2002.

"MediaTone—The 'Dial Tone' for Web Communications Services," Webex, 2003.

"Accessline Comms' Accessline Service, The One-Number Wonder," *CommWeb*, T. Kramer, Feb. 1, 2000, http://www.cconvergence.com/article/TCM20000504S0014.

"InteleScreener," 2003, http://www.intelescreener.com/howitworks.html.

"TeleZapper from Privacy Technologies," Privacy Corps—Our Review, 2002, http://www.privacycorps.com/pages/product1.htm.

"A Proposal for Internet Call Waiting Service Using SIP," A. Brusilovsky et al., Lucent Technologies, PINT Working Group, Internet Draft, Jan. 1999.

"A Model for Presence and Instant Messaging," M. Day et al., Fujitsu, Feb. 2000, Network Working Group, Request for Comments 2778.

Data Connection, Strategic Computer Technology, MeetingServer, "Broadband for Learning Case Study," Data Connection Ltd, 1998-2004, http://www.dataconnection.com/conferencing/meetingserver_casestudy.htm.

Data Connection, MailNGen, "Next Generation Messaging for Service Providers," Data Connection Limited, 2003-4.

Data Connection, Strategic Computer Technology, "Directories Explained," Data Connection Ltd, 1998-2004, http://www.dataconnection.com/inetapps/direxpl.htm.

Data Connection, Strategic Computer Technology, Directory Systems, "Directories and Meta-Directories," Data Connection Ltd, 1998-2004, http://www.dataconnection.com/inetapps/directory.htm.

Data Connection, Strategic Computer Technology, "DC-IMS\Voice Unified Messaging Gateway," Data Connection Ltd, 1998-2000, http://web.archive.org/web/20010307174512/www.dataconnection.com/messging/spivoice.htm.

Data Connection, Strategic Software Technology, "DC-SurroundSuite for Service Providers," Data Connection Ltd, 1998-2000, http://web.archive.org/web/20000914200355/www.dataconnection.com/messging/spssuite.htm.

Data Connection, Strategic Computer Technology, "Messaging Software Products and Services," Data Connection Ltd, 1998-2000, http://web.archive.org/web/20000819063320/www.dataconnection.com/messging/messgidx.htm.

Data Connection, Strategic Software Technology, "DC-Share for UNIX," Data Connection Ltd, 1998-2000, http://web.archive.org/web/20000914200713/www.dataconnection.com/conf/DCshare.htm.

Data Connection, Strategic Software Technology, "DC-H.323," Data Connection Ltd, 1998-2000, http://web.archive.org/web/20001120050600/www.dataconnection.com/conf/h323.htm.

Data Connection, Strategic Software Technology, "DC-WebShare," Data Connection Ltd, 1998-2000, http://web.archive.org/web/20001016115016/www.dataconnection.com/conf/webshare.htm.

Data Connection, Strategic Computer Technology, "DC-Recorder," Data Connection Ltd, 1998-2000, http://web.archive.org/web/20001016055611/www.dataconnection.com/conf/recorder.htm.

Data Connection, Strategic Software Technology, "DC-MeetingServer," Data Connection Ltd, 1998-2000, http://web.archive.org/web/20000914200719/www.dataconnection.com/conf/meetingserver.htm.

Data Connection, Strategic Computer Technology, "DC-MeetingServer," Data Connection Ltd, 1998-2000, http://web.archive.org/web/20021201144529/www.dataconnection.com/inetapps/conferencing.htm.

Data Connection, Strategic Software Technology, "DC-VoiceNet Features," Data Connection Ltd, 1998-2000, http://web.archive.org/web/20001016102614/www.dataconnection.com/messging/vnfeat.htm.

Data Connection, Strategic Software Technology, "DC-VoiceNet," Data Connection Ltd, 1998-2000, http://web.archive.org/web/20000914200424/www.dataconnection.com/messging/vnet.htm.

Data Connection, Strategic Computer Technology, "Messaging Software Products and Services," Data Connection Ltd, 1998-2000, http://web.archive.org/web/20010305143803/www.dataconnection.com/messging/messgidx.htm.

Data Connection, Strategic Computer Technology, "DC-SurroundSuite for Enterprises," Data Connection Ltd, 1998-2000, http://web.archive.org/web/20010306082711/www.dataconnection.com/messging/enssuite.htm.

Data Connection, "SmartDialer Functional Overview," Version v1.0, Internet Applications Group, Data Connection Ltd., Nov. 3, 2003.

Data Connection, "SIP Market Overview, An analysis of SIP technology and the state of the SIP Market," Jonathan Cumming, Data Connection Ltd., 2003-2004.

Data Connection, "Integrating Voicemail Systems, A white paper describing the integration of heterogeneous voicemail systems," Michael James, Internet Applications Group, Data Connection Ltd., 2004.

Data Connection, Strategic Computer Technology, "MailNGen: Next generation messaging for Service Providers," Data Connection Ltd, 1998-2004, http://www.dataconnection.com/messaging/.

Data Connection, Strategic Computer Technology," MailNGen: Unified Messaging," Data Connection Ltd, 1998-2004, http://www.dataconnection.com/messaging/unified_messaging.htm.

Data Connection, Strategic Computer Technology, "MeetingServer: The award-winning web conferencing solution for Service Providers," Data Connection Ltd, 1998-2005, http://www.dataconnection.com/conferencing/.

Data Connection, Strategic Computer Technology, "MeetingServer: The web conferencing solution for Service Providers," Data Connection Ltd, 1998-2004, http://www.dataconnection.com/conferencing/meetingserver.htm.

Data Connection, Strategic Computer Technology, "MeetingServer: Web conferencing architecture," Data Connection Ltd, 1998-2004, http://www.dataconnection.com/conferencing/meetingserver_arch.htm.

U.S. Appl. No. 09/828,679, filed Apr. 6, 2001, Craig Reding et al. cited by other.

"The Mobile Phone User Guide", http://www.mobileshop.org/usertech/wildfire.htm, printed Oct. 1, 2004.

Kornowski, J., "Wildfire at Your Back and Call-A Voice-Activated Telephone Assistant That Minds You and Your Messages", http://www.lacba.org/lalawyer/techwildfire.html, printed Oct. 1, 2004.

Cisco Personal Assistant 1.4, Cisco Systems, Jun. 24, 2003, http://www.cisco.com/en/US/products/sw/voicesw/ps2026/prod_presentation_list.html, printed Oct. 1, 2004.

"Calendar Scheduling Teleconference Communication Mechanism," IBM Technical Disclosure Bulletin, IBM Corp. New York, US, vol. 37, No. 3, Mar. 1, 1994, p. 561.

White, "How Computers Work," Millenium Edition, Sep. 1999, Que Corporation, pp. vi-xi, 135-184, 399-421.

Derfler et al., "How Networks Work," Bestseller Edition, 1996, Ziff-Davis, pp. vi-ix, 1-3, 21-70, 190-198.

Gralla, "How the Internet Works," Ziff-Davis Press, 1999, pp. vi-xi, 2-3, 8-11, 308-324.

Muller, "Desktop Encyclopedia of the Internet," Artech House Inc., 1999, pp. v-xiv, 233-246, 539-559.

"FAQ Premium Home Answer" eVoice, http://content.evoice.com/wcs/signUp/FAQ_premHA_s01.htm, Jul. 2, 2001.

"Audio Digitizing Process," TalkBank, http://www.talkbank.org/da/audiodig.html, Oct. 15, 2003.

"Macromedia SoundEdit 16 Support Center-Working with Other Programs, What is Shockwave Audio Streaming?" http://www.macromedia.com/support/soundedit/how/shock/whatis.html, Oct. 24, 2003.

"How Internet Radio Works," Howstuffworks, http://computer.howstuffworks.com/internet-radio.htm/printable, Oct. 16, 2003.

"Real-Time Collaboration Integration in the Portal," T. Odenwald, SAP Design Guild, http://www.sapdesignguild.org/editions/edition5/synch_collab.asp, Oct. 6, 2003.

"NetMeeting101," http://www.meetingbywire.com/NetMeeting101.htm, Oct. 6, 2003.

"NetMeeting102," http://www.meetingbywire.com/NetMeeting102.htm, Oct. 6, 2003.

"Instructions on Application Sharing and Data Collaboration," VCON Escort and Cruiser, http://www.vide.gatech.edu/docs/share/, Oct. 6, 2003.

"Instructions on Multipoint Application Sharing and Data Collaboration," VCON Escort and Cruiser with the RadVision MCU, http://www.vide.gatech.edu/docs/multi-share/, Oct. 6, 2003.

Business Solutions/Professional, http://www.accessline.com/business_sol/bs_professional_body.html, Apr. 17, 2003.

* cited by examiner

| Device 502 | Address 504 |
|---|---|
| Home Phone | 650 555 1234 |
| Cell Phone | 408 555 1235 |
| Email Address | joe@inter.net |
| Pager | 650 555 1236 |

| Pattern Name 508 | Start Date 510 | Start Time 512 | End Date 514 | End Time 516 | Source 518 | Destination 520 | Forwarding 522 |
|---|---|---|---|---|---|---|---|
| AT HOME | | 12:00 AM | | 8:00 AM | All | Home | Cell |
| TRAVEL | | 8:00 AM | | 12:00 PM | All | All | Email |
| AT WORK | | 12:00 AM | | 5:00 PM | All | All | Voice Mail |
| WIFE AT WORK | | 5:00 PM | | 9:00 PM | Wife | Work | Cell |
| AT HOME 2 | | 5:00 PM | | 9:00 PM | All | Work | Voice Mail |

METHOD AND APPARATUS FOR UNIFIED COMMUNICATION MANAGEMENT VIA INSTANT MESSAGING

RELATED APPLICATIONS

Applicants claim the right to priority under 35 U.S.C. § 119(e) based on Provisional Patent Application No. 60/272,122, entitled "VOICE MAIL INTEGRATION WITH INSTANT MESSENGER," filed Feb. 27, 2001; Provisional Patent Application No. 60/272,167, entitled "DEVICE INDEPENDENT CALLER ID," filed Feb. 27, 2001; Provisional Patent Application No. 60/275,667, entitled "CALENDAR CALLING AGENT," filed Mar. 13, 2001; Provisional Patent Application No. 60/275,719, entitled "CALENDAR CALLING AGENT," filed Mar. 13, 2001; Provisional Patent Application No. 60/275,020, entitled "METHOD AND APPARATUS FOR INTEGRATED BILLING VIA PDA," filed Mar. 13, 2001; Provisional Patent Application No. 60/275,031, entitled "METHOD AND APPARATUS FOR UNIFIED COMMUNICATIONS MANAGER VIA INSTANT MESSAGING," filed Mar. 13, 2001; and Provisional Patent Application No. 60/276,505, entitled "METHOD AND APPARATUS FOR CONTEXT BASED QUERYING," filed Mar. 19, 2001, and all of which are expressly incorporated herein by reference in their entirety.

The present application also relates to U.S. patent application Ser. No. 10/083,792, entitled "VOICE MAIL INTEGRATION WITH INSTANT MESSENGER"; U.S. patent application Ser. No. 10/083,884, entitled "DEVICE INDEPENDENT CALLER ID,"; U.S. patent application Ser. No. 10/084,390, entitled "METHOD AND APPARATUS FOR CONTEXT BASED QUERYING,"; U.S. patent application Ser. No. 10/083,793, entitled "METHOD AND APPARATUS FOR CALENDARED COMMUNICATIONS FLOW CONTROL,"; U.S. patent application Ser. No. 10/084,121, entitled "CALENDAR-BASED CALLING AGENTS,"; U.S. patent application Ser. No. 10/083,798, entitled "METHOD AND APPARATUS FOR INTEGRATED BILLING VIA PDA,"; and U.S. patent application Ser. No. 10/084,002, entitled "METHOD AND APPARATUS FOR DIAL STREAM ANALYSIS,", and all of which are expressly incorporated herein by reference in their entirety.

FIELD OF THE INVENTION

The present invention relates to managing communications and, more particularly, to methods and apparatus for a unified communication management via instant messaging.

BACKGROUND OF THE INVENTION

A wide variety of means exist for communication between users. For example, a user may conduct phone calls via their home phone, work phone, and mobile phone. In addition, a user may also communicate via email and instant messaging.

Unfortunately, managing such a wide variety of communication means can be difficult. In particular, as a user changes location communication with the user may vary. For example, the user, while on travel may only be reached by cell phone. However, the user may best be reached by email while at work. Also, the user may wish to implement various rules for receiving and controlling communications. For example, to be reached at home, the user may want the home phone to ring three times before forwarding the call to a cell phone. As another example, the user may wish to be paged each time an email is received from a particular person while away from the office.

Typically, to implement communication management, a person must individually manage each communication device separately. Thus, when the user wishes to change how communication is managed, the user may have to deal with numerous devices and, perhaps, service centers.

SUMMARY OF THE INVENTION

In accordance with an embodiment consistent with the principles of the present invention, a method is provided for managing communication devices utilizing at least one unified communication manager connected to a telephone network and a data network. The method performed by the at least one unified communication manager involves receiving an instant message from a user containing a request to configure at least one of the communication devices, configuring a connection for the one of the communication devices based on information in the instant message, and providing the user notification of the configuration of the connection for the one of the communication devices, the user notification being displayed on a display device for the user.

In accordance with another embodiment consistent with the principles of the present invention, a computer readable medium capable of configuring a computer to perform a method of managing communication devices via a network comprising a telephone network, a data network, and at least one unified communication manager connected to both the telephone network and the data network is provided. The method performed by the unified communication manager involves receiving an instant message from a user containing a request to configure at least one of the communication devices, configuring a connection for the one of the communication devices based on information in the instant message, and providing the user notification of the configuration of the connection for the one of the communication devices, the user notification being displayed on a display device for the user.

In accordance with another embodiment consistent with the principles of the present invention, an apparatus for managing communication devices via a network comprising a telephone network, a data network, and at least one unified communication manager connected to both the telephone network and the data network is provided. The apparatus comprises means for receiving an instant message from a user containing a request to configure at least one of the communication devices, means for configuring a connection for the one of the communication devices based on information in the instant message, and means for providing the user notification of the configuration of the connection for the one of the communication devices, the user notification being displayed on a display device for the user.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this specification, illustrate one embodiment of the invention and, together with the description, serve to explain the principles of the invention.

FIG. 4b is a detailed block diagram of the unified communications server of FIG. 4a;

FIGS. 5a-5b are exemplary record tables used for controlling communications, in accordance with methods and apparatus consistent with the principles of the present invention;

DETAILED DESCRIPTION

Methods and apparatus for unified communication management via instant messaging are provided. A unified communication manager receives from a data network one or more rules for responding to telephone calls. In particular, a user may interface with the unified communication manager using an instant messaging service to manage various aspects of the user's communication such as phone calls, email, and instant messages. A user may also use the manager to manage contact information and profile information, such as rules for how communications are forwarded to the user. Thus, the user is provided with a unified communication manager to implement rules and conditions across a wide variety of devices and networks.

Reference will now be made in detail to exemplary embodiments of the present invention, examples of which are illustrated in the accompanying drawings. Wherever possible, the same reference numbers will be used throughout the drawings to refer to the same or like parts.

Figure 1:
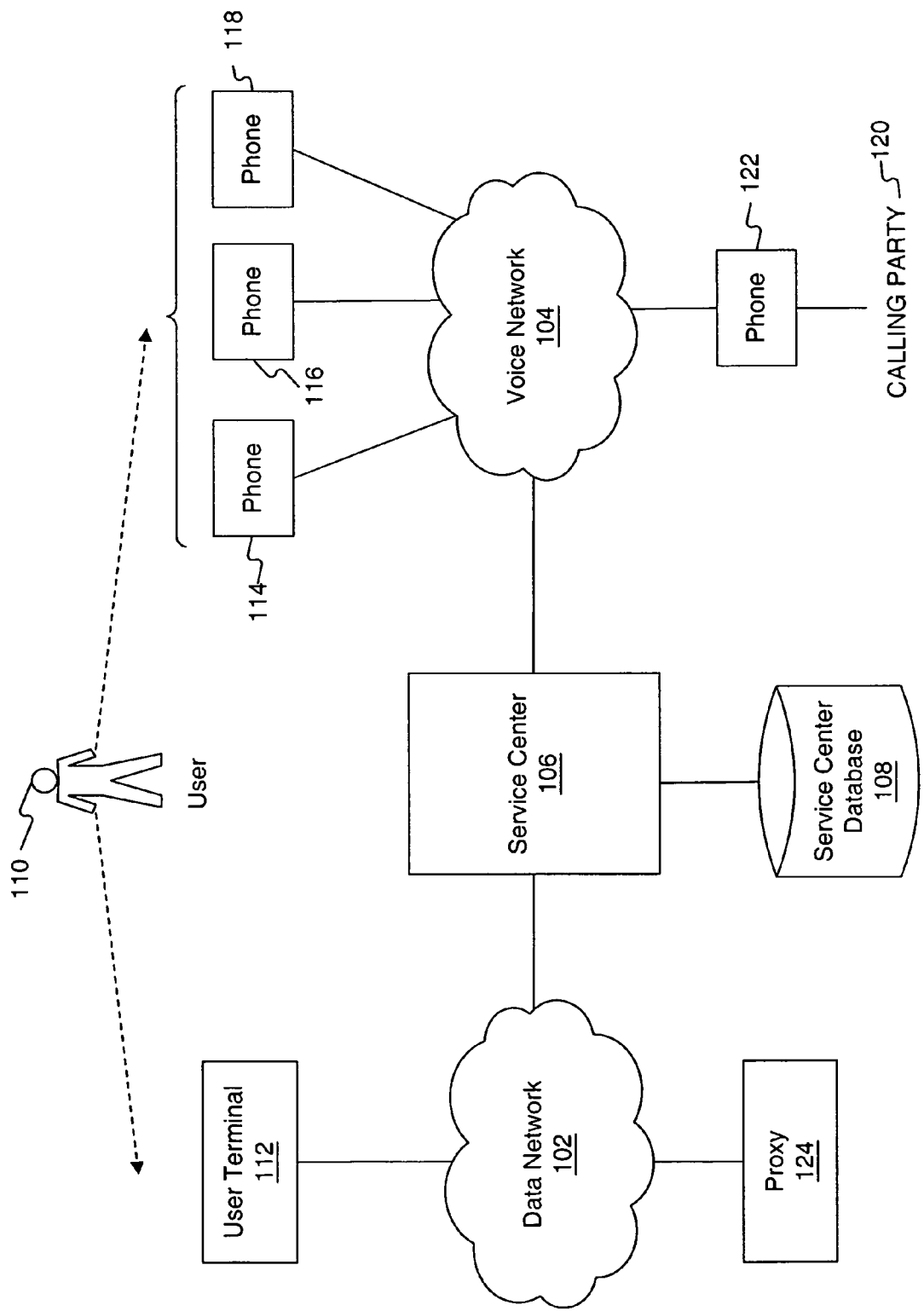
FIG. 1 is a block diagram of a data processing and telecommunications environment, in accordance with methods and apparatus consistent with the principles of the present invention.

FIG. 1 is a block diagram of a data processing and telecommunications environment, in accordance with methods and apparatus consistent with the principles of the present invention. The data processing and telecommunications environment 100 may include a data network 102, a voice network 104, a service center 106, and a service center database 108. As shown, a user 110 may use a user terminal 112 to interface data network 102. In addition, user 110 may use phones 114, 116, and 118 to interface with voice network 104. For example, calling party 120 may use phone 122 to call user 110 at any one of phones 114, 116, and 118.

Data network 102 provides communications between the various entities depicted in environment 100 of FIG. 1, such as user terminal 112 and service center 106. Data network 102 may be a shared, public, or private network and encompass a wide area or local area. For example, data network 102 may be implemented on a network, such as the Internet.

Voice network 104 provides telephony services, for example, to allow calling party 120 to place a telephone call to user 110. For example, voice network 104 may be implemented using a network, such as the Public Switched Telephone Network ("PSTN"). Alternatively, voice network 104 may be implemented using voice-over Internet Protocol ("VOIP") technology. In addition, voice network 104 may be implemented using both the PSTN and VoIP technology consistent with the principles of the present invention. Voice network 104 is described in further detail with reference to FIG. 6.

Service center 106 provides a platform for managing communications over data network 102 and voice network 104. In addition, service center 106 provides gateway functions, such as code and protocol conversions, to transfer communications between data network 102 and voice network 104. Service center 106 may be implemented using a combination of hardware and software. For example, service center 106 may be implemented using a plurality of a general purpose computers or servers coupled by a network (not shown). Although service center 106 is shown with direct connections to data network 102 and voice network 104, any number and type of network elements may be interposed between service center 106, data network 102, and voice network 104. Service center 106 is described in further detail with reference to FIG. 4.

Service center database 108 contains information regarding user 110. For example, service center database 108 may contain information including, an identifier for user 110, a password, one or more email addresses for user 110, one or more instant messaging identifiers for user 110, and one or more telephone numbers, such as for phones 114, 116, and 118. Service center database 308 may also indicate which server, e.g., unified communications server 460, should be notified when a communications event occurs. Additionally, service center database 108 may contain configuration information that indicate rules for how and when communications are forwarded, such as telephone calls over voice network 104. Service center database 108 may be implemented as an Oracle™ database using a combination of known hardware and software, such as Proliant™ servers and EMC storage devices.

User terminal 112 provides user 110 an interface to data network 102. For example, user terminal 112 may be implemented using any device capable of accessing the Internet, such as a general purpose computer or personal computer equipped with a modem. User terminal 112 may also be implemented in other devices, such as the Blackberry™, and Ergo Audrey™. Furthermore, user terminal 112 may be implemented in wireless devices, such as pagers, mobile phones (with data access functions), and Personal Digital Assistants ("PDA") with network connections.

User terminal 112 also allows user 110 to communicate with service center 106. For example, user 110 may use instant messaging ("IM") to communicate with service center 106. IM is a communications service implemented over the Transmission Control Protocol and Internet Protocol ("TCP/IP") suite to create a private communication channel. As is well known to those skilled in the art, instant messaging provides communications transmitted in real-time over a non-persistent communication channel that is established by an instant messaging service. Although there is no accepted universal IM standard, an appropriate IM model may be found in RFC 2778, M. Day et al., The Internet Society (2000), titled "A Model for Presence and Instant Messaging," which describes, inter alia, a model for providing instant messaging services. There are presently several known IM services including America OnLine Instant Messenger ("AIM") and Microsoft Network Messenger Service ("MSNMS"). In addition to IM services, user terminal 112 may use other aspects of TCP/IP including the hypertext transfer protocol ("HTTP"); the user datagram protocol ("UDP"); the file transfer protocol ("FTP"); the hypertext markup language ("HTML"); and the extensible markup language ("XML").

User terminal 112 may communicate directly with service center 106. For example, a client application may be installed on user terminal 112, which directly communicates with service center 106. Alternatively, user terminal 112 may communicate with service center 106 via proxy 124. User terminal 112 is described in further detail with reference to FIG. 2.

Proxy 124 provides an intermediate communications service for user terminal 112 and service center 106. Proxy 124 may act on behalf of user 110 to interface service center 106 and provides functions, such as authentication services, and protocol translation services. For example, user 110 may be a MSNMS subscriber and proxy 124 may be a MSNMS server. User 110 may then use MSNMS IM services to indirectly interface service center 106. As another example, proxy 124 may be a web site. User 110 may provide information, such as information for call forwarding patterns, to proxy 124 via web pages and secured using secured sockets layer ("SSL"). Proxy 124 may then establish an SSL session with service 106 and provide the information from user 110.

Phones 114, 116, 118, and 122 interface voice network 104. Phones 114, 116, 118, and 122 may be implemented using known devices, including wireline phones and mobile phones, such as wireless phones. Although phones 114, 116, 118, and 122 are shown directly connected to voice network 104, any number of intervening elements, such as a private branch exchange ("PBX"), may be interposed between phones 114, 116, 118, and 122 and voice network 104.

Figure 2:
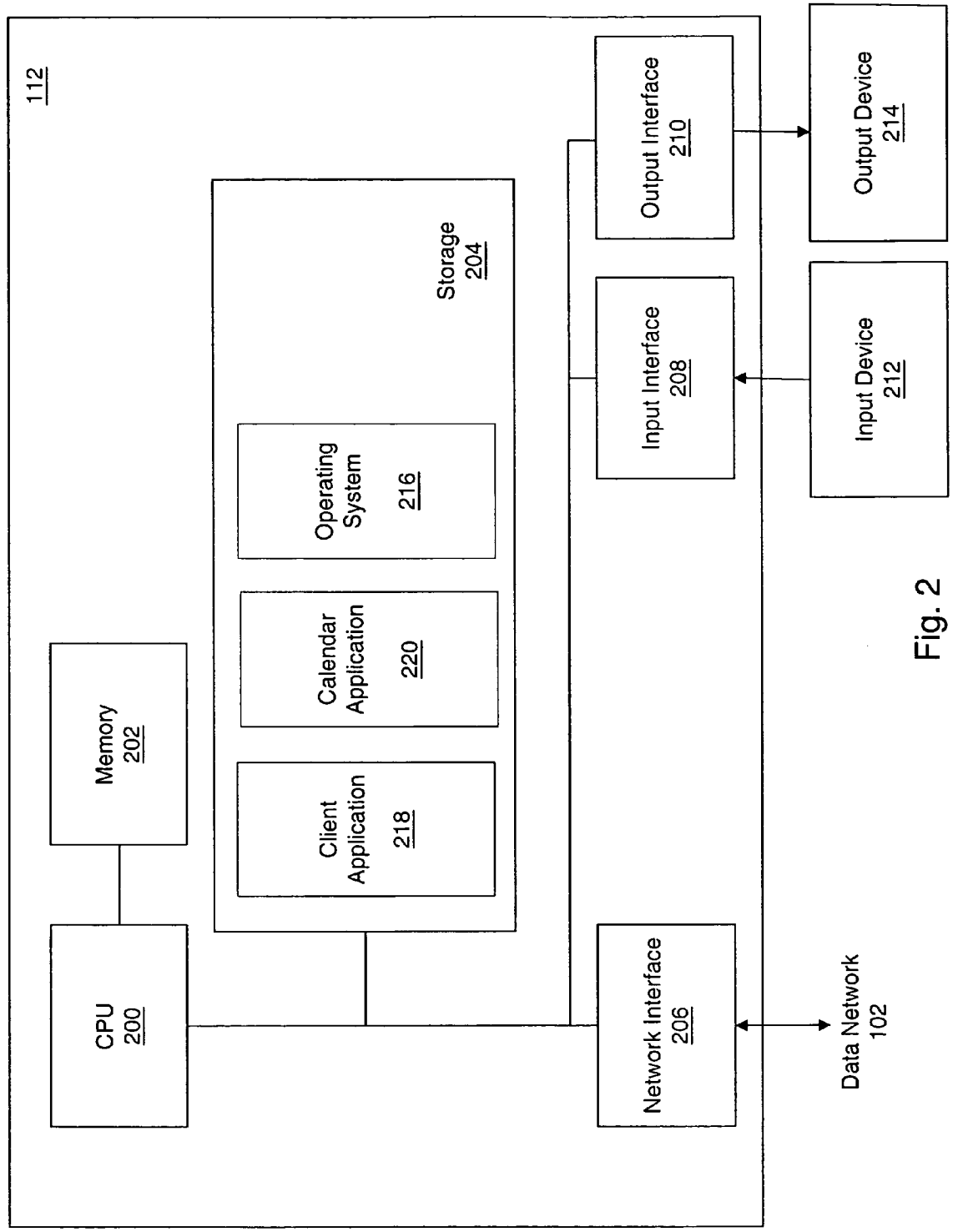
FIG. 2 is a block diagram of a user terminal, in accordance with methods and apparatus consistent with the principles of the present invention.

FIG. 2 is a block diagram of a user terminal, in accordance with methods and apparatus consistent with the principles of the present invention. As shown, user terminal 112 includes a central processing unit (CPU) 200, a memory 202, a storage module 204, a network interface 206, an input interface 208, an output interface 210, an input device 216, and an output device 218.

CPU 200 provides control and processing functions for user terminal 112. Although FIG. 2 illustrates a single CPU, user terminal 112 may include multiple CPUs. CPU 200 may also include, for example, one or more of the following: a co-processor, memory, registers, and other processing devices and systems as appropriate. For example, CPU 200 may be implemented using a Pentium™ processor provided from Intel Corporation.

Memory 202 provides a primary memory for CPU 200, such as for program code. Memory 202 may be embodied with a variety of components of subsystems, including, a random access memory ("RAM"), and a read-only memory ("ROM"). For example, when user terminal 112 executes an application installed in storage module 204, CPU 200 may download at least a portion of the program code from storage module 204 into memory 308. As CPU 200 executes the program code, CPU 200 may also retrieve additional portions of program code from storage module 204.

Storage module 204 provides mass storage for user terminal 112. Storage module 204 may be implemented with a variety of components or subsystems including, for example, a hard drive, an optical drive, a general-purpose storage device, a removable storage device, and/or other devices capable of storing information. Further, although storage module 204 is shown within user terminal 112, storage module 204 may be implemented external to user terminal 112.

Storage module 204 includes program code and information for user terminal 112 to communicate with service center 106. Storage module 204 includes program code for a calendar application 216, such as GroupWise provided by Novell Corporation, or Outlook provided by Microsoft Corporation; a client application 218, such as a MSNMS client, or AIM client; and an Operating System (OS) 216, such as the Windows Operation System provided by Microsoft Corporation. In addition, storage module 204 may include other program code and information (not shown), such as program code for TCP/IP communications; kernel and device drivers; configuration information, such as a Dynamic Host Configuration Protocol (DHCP) configuration; a web browser, such as Internet Explorer provided by Microsoft Corporation, or Netscape Navigator provided by Netscape Corporation; and any other software that may be installed on user terminal 112.

Network interface 206 provides a communications interface between user terminal 112 and data network 102. Network interface 206 may receive and transmit communications for user terminal 112. For example, network interface 206 may be a modem, or a local area network ("LAN") port.

Input interface 208 receives input from user 110 via input device 212 and provides the input to CPU 200. Input device 212 may include, for example, a keyboard, a microphone, and a mouse. Other types of input devices may also be implemented consistent with the principles of the present invention.

Output interface 210 provides information to user 110 via output device 214. Output device 214 may include, for example, a display, a printer, and a speaker. Other types of output devices may also be implemented consistent with the principles of the present invention.

Figure 3A:
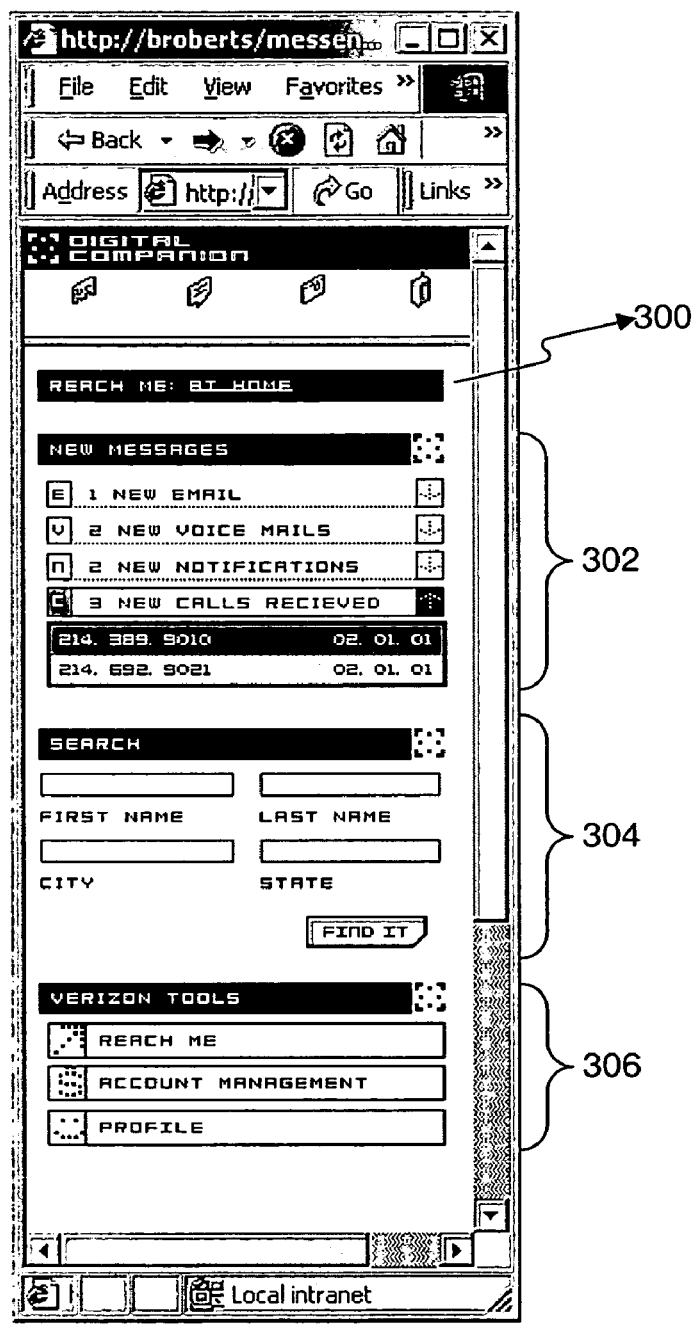
FIGS. 3a-3m are exemplary screen shots in accordance with methods and apparatus consistent with the principles of the present invention.

FIGS. 3a-3m illustrate exemplary screen shots of user interfaces to implement voice mail integration with instant messenger. As shown in FIG. 3a, the screen shot provides a current location portion 300 for indicating that communications should be directed to the "AT HOME" location. Current location 300 may also indicate other locations, such as, for example, "AT WORK, "IN CAR", and "ON TRAVEL." Such locations can be based on predetermined choices or user-configurable choices. The screen shot also provides a new message portion 302 that lists the number and type of new messages. In particular, new message portion 302 shows that there is "1 New EMAIL", "2 NEW VOICE MAILS", "2 NEW NOTIFICATIONS", and "3 NEW CALLS RECEIVED". New message portion 302 can also provide the last phone numbers dialed and the date they were dialed.

The screen shot also provides a search portion 304 that allows a user to search for contact information regarding a particular person. For example, search portion 304 provides "FIRST NAME", "LAST NAME", "CITY", and "STATE" search inputs to find contact information of a particular person. The screen shot also provides a tools portion 306 that gives a user options to modify various aspects of the communications service. These options may include "REACH ME", "ACCOUNT MANAGEMENT", and "PROFILE" options. The "REACH ME" option allows a user to change where a user is to be contacted shown in the current location portion 300. The "ACCOUNT MANAGEMENT" option allows a user to modify information such as billing information associated with a called party. The "PROFILE" option allows a user to modify how communications are forwarded.

Figure 3B:
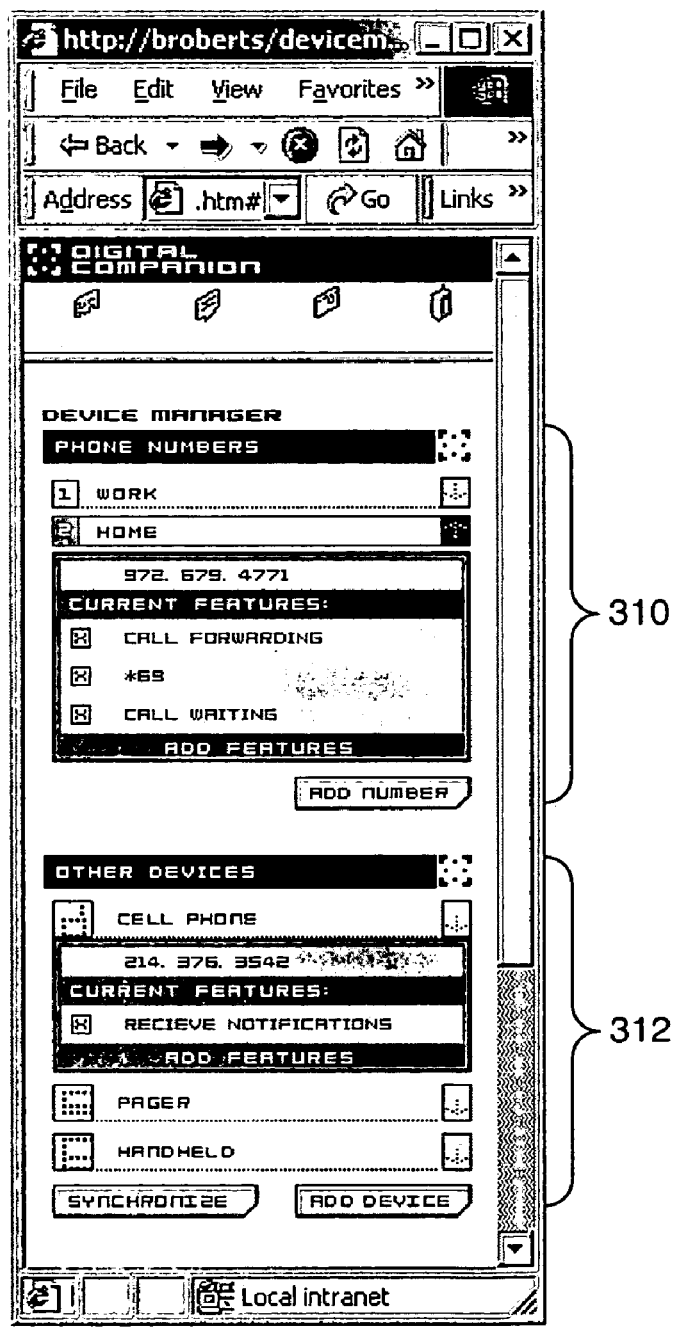

As shown in FIG. 3b, the screen shot shows a user interface for a device manager. The screen shot shows a device manager portion 310 that allows a user to view and to change phone number settings. For example, the user can change at "WORK" and "AT HOME" phone number settings. Device manage portion 310 also provides a "CURRENT FEATURES" option that lists features being used. Such features include "CALL FORWARDING", "*69", and "CALL WAITING". The user also has the option to "ADD FEATURES" or "ADD NUMBERS". The screen shot also provides a other devices portion 312 that allows a user to manage devices which are not associated with a particular location. Other devices portion 310 lists "CELL PHONE", "PAGER", and "HANDHELD" devices as other devices in which a user can manage. For each device, a user can view the number for the other device and associated "CURRENT FEATURES" for the other device. Other devices portion 310 also provides a "SYNCHRONIZE" option and "ADD DEVICE" option for the user.

Figure 3C:
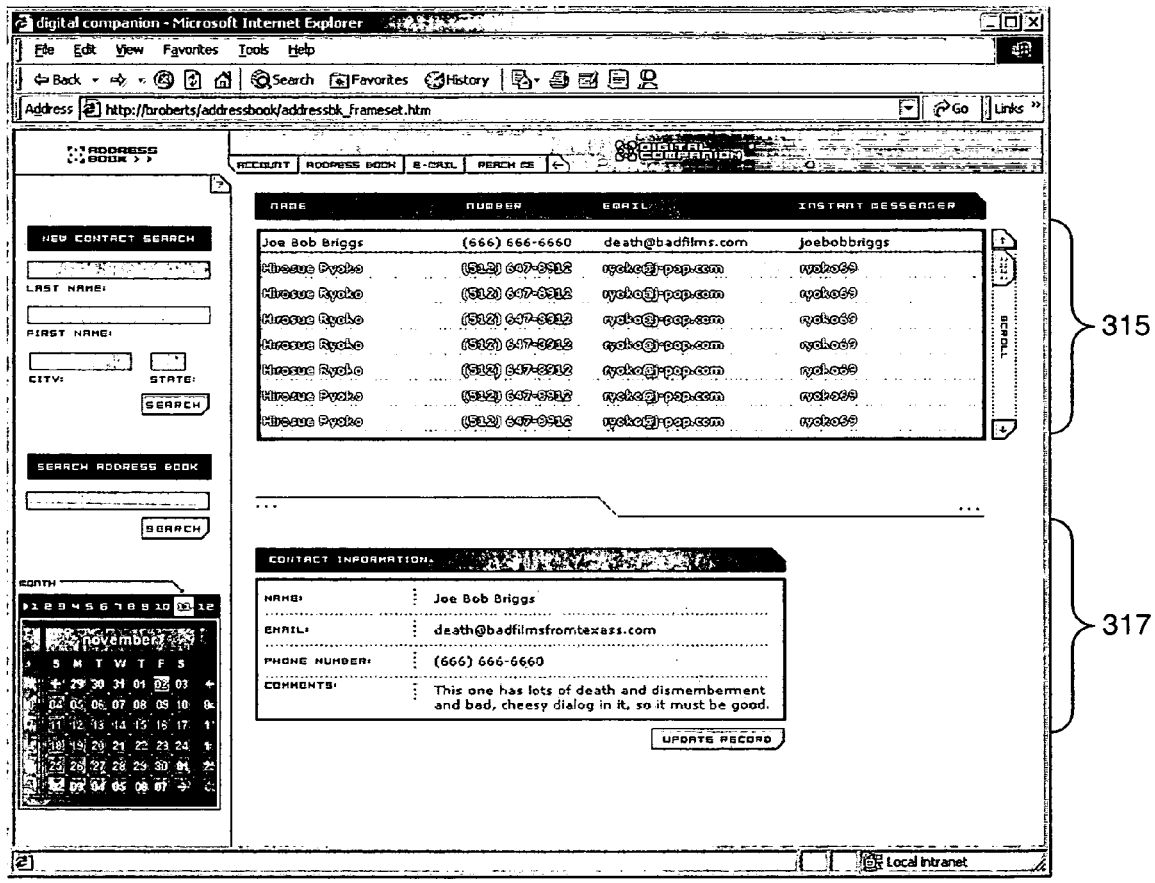

As shown in FIG. 3c, the screen shot shows a user interface for an address book. The screen shot shows an address list portion 315 that lists contact information for the user. For example, the contact information may include "NAME", "ADDRESS", "EMAIL", and "INSTANT MESSENGER" information. The screen shot also shows a record information portion 317 that displays a specific record for a contact. The user has the option to "UPDATE" the record. The screen shows also provides a search window to search for contact information and a calendar.

Figure 3D:
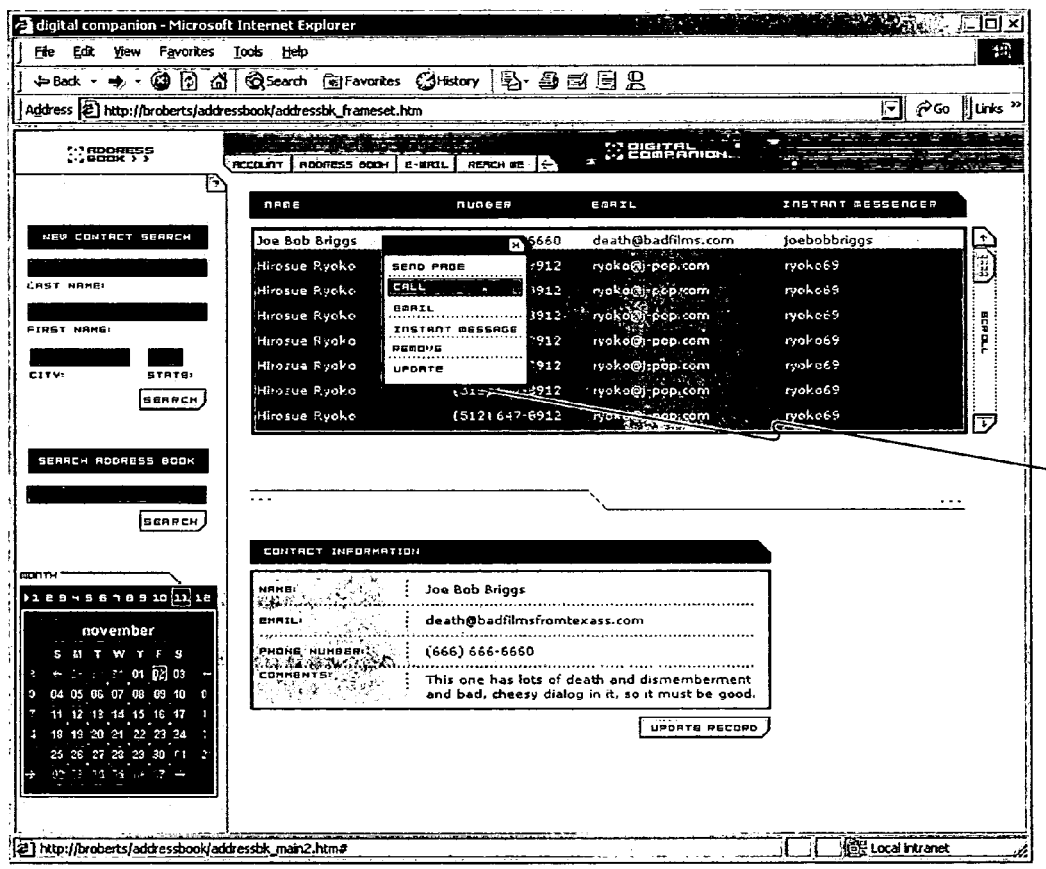

As shown in FIG. 3d, the screen shot shows the user interface of FIG. 3c with a pull-down menu 320 that provides a number of options for a user to contact a selected person consistent with the present invention. For example, the user can contact the selected person using such options as "SEND PAGE", "CALL", "EMAIL", and "INSTANT MESSAGE". Pull-down menu 320 also provides a "REMOVE" and "UPDATE" option to modify contact information in the address book.

Figure 3E:
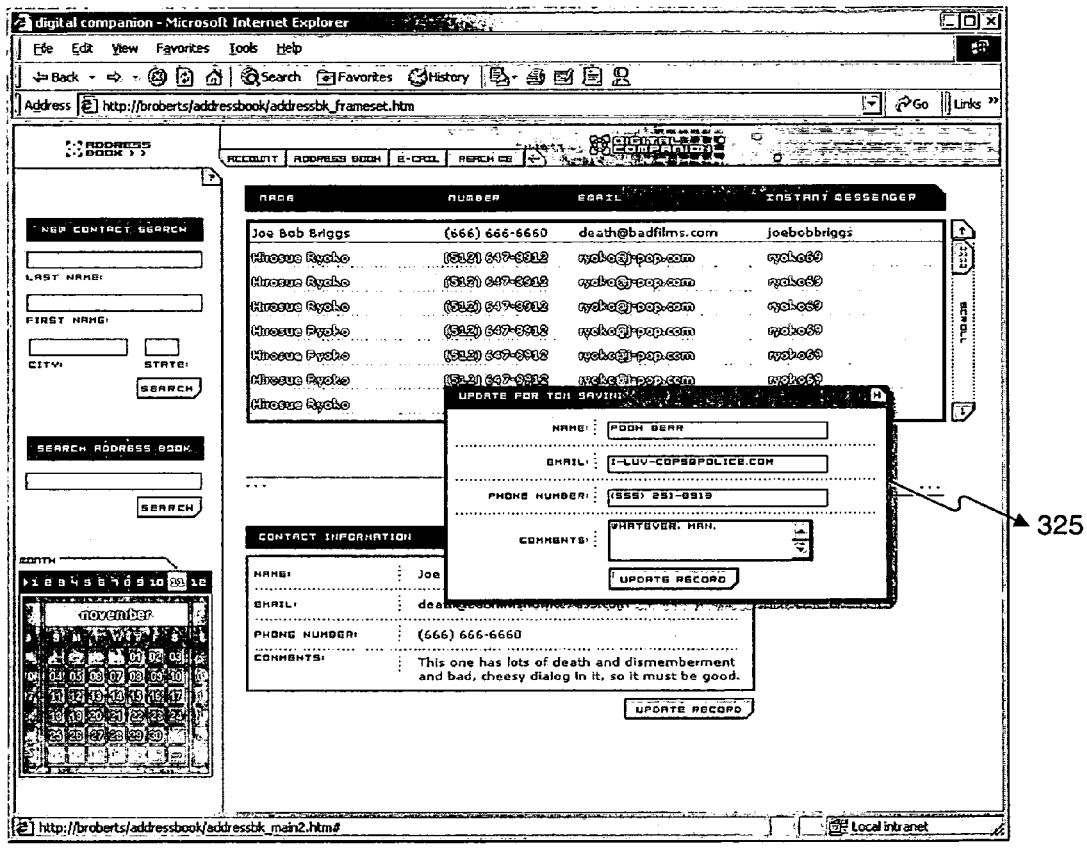

As shown in FIG. 3e, the screen shot shows the user interface of FIG. 3c with a pop-up window 325 that provides a number of inputs to modify contact information for a person in the address book. Pop-up window 325 is shown to update a record for "TOM SERVINI" using, e.g., "NAME", "EMAIL", and "PHONE NUMBER" inputs. Pop-up window 325 may also provide a "COMMENTS" window for the user to input a comment.

Figure 3F:
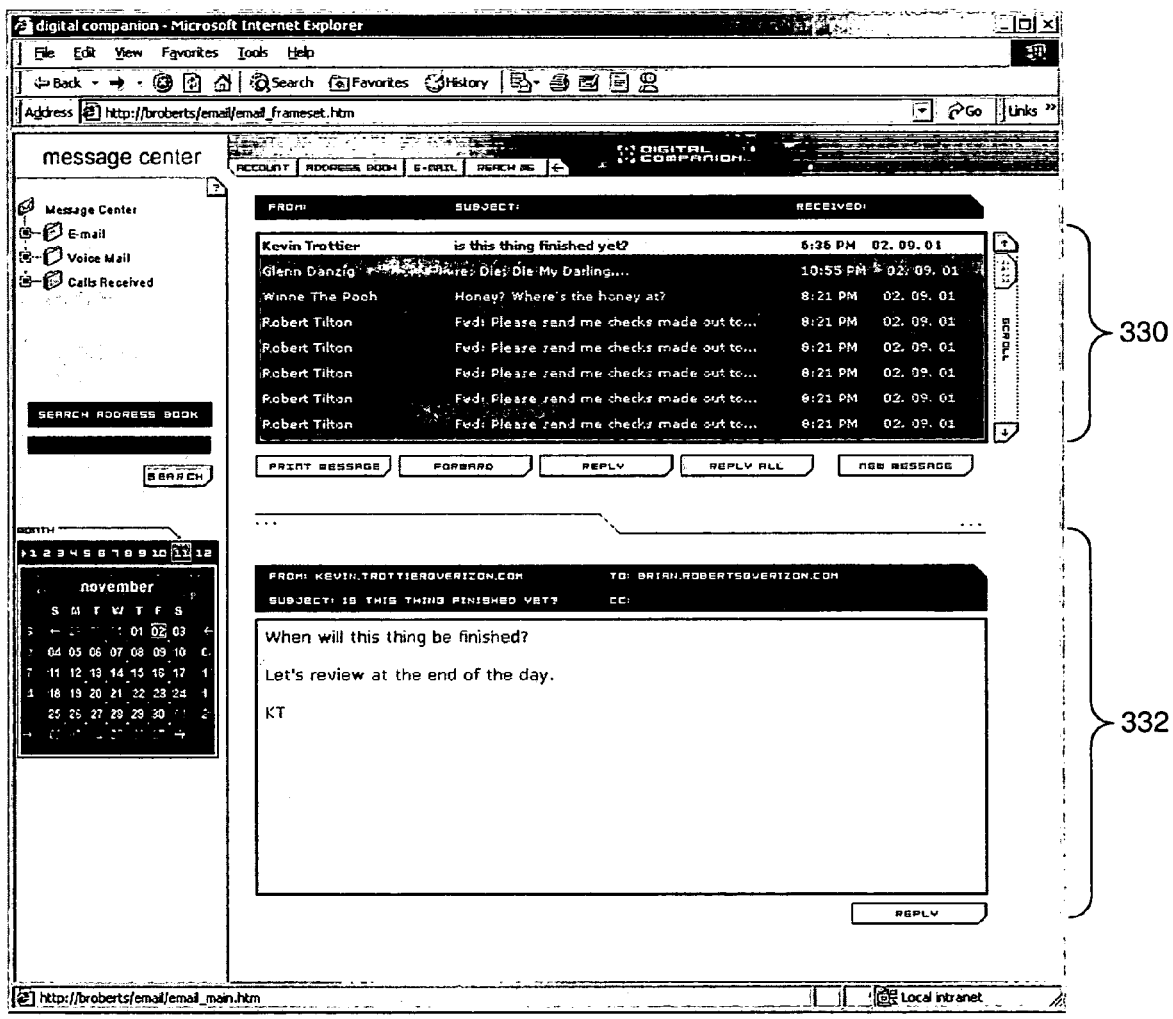

As shown in FIG. 3f, the screen shot shows a user interface for a message center panel having a summary portion 330 that lists messages received in a "RECEIVED:" column, the subject of the received messages in a "SUBJECT:" column, and the name of the persons who sent the messages in a "FROM:" column. Summary portion 330 may also provide other types of information such as the date/time the message was received, the data size of the message, or an attachment indicator. Additionally, summary portion 330 may provide a summary of recent e-mails or instant messages received by the user. Summary portion 330 also provides a number of options to process the messages. For example, the user may select a "PRINT MESSAGE", "FORWARD", "REPLY", "REPLY ALL", or "NEW MESSAGE" option for the listed messages in summary portion 330. The screen shot also shows a detail view portion 332 that provides the details of a selected message. For example, the details of an email message from "KEVIN.TROTTIER" are shown. Detail view portion 322 also provides a "REPLY" option to reply to the viewed message.

Figure 3G:
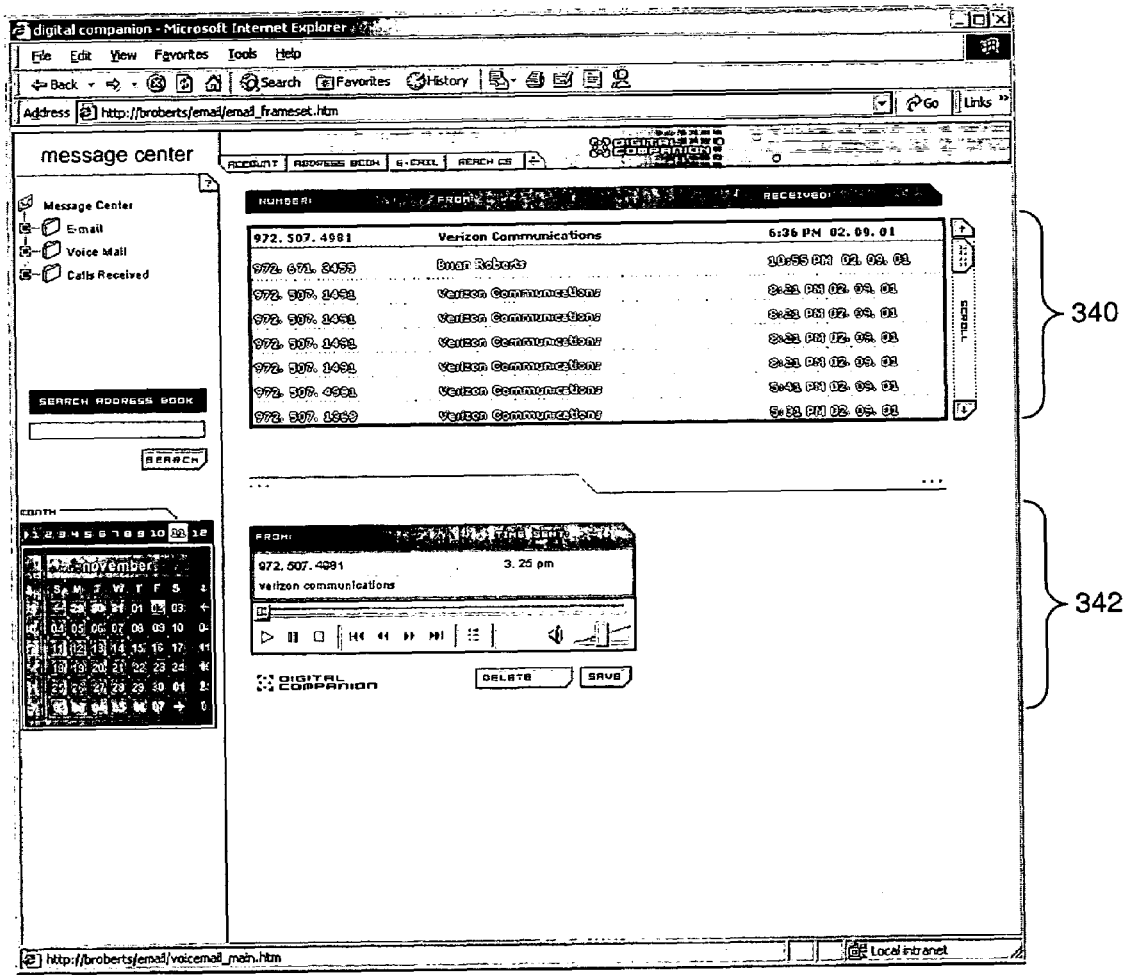

As shown in FIG. 3g, the screen shot shows a user interface for a message center panel having a summary portion 340, which is similar to summary portion 330 of FIG. 3f. Summary portion 340 provides summary information applicable to voice mails in a "NUMBER:", "FROM:" and "RECEIVED:" column. The screen shot also shows a detail portion 342 that allows a user to playback the voice message. Detail portion 342 also allows the user to "DELETE" or "SAVE" the voice message.

Figure 3H:
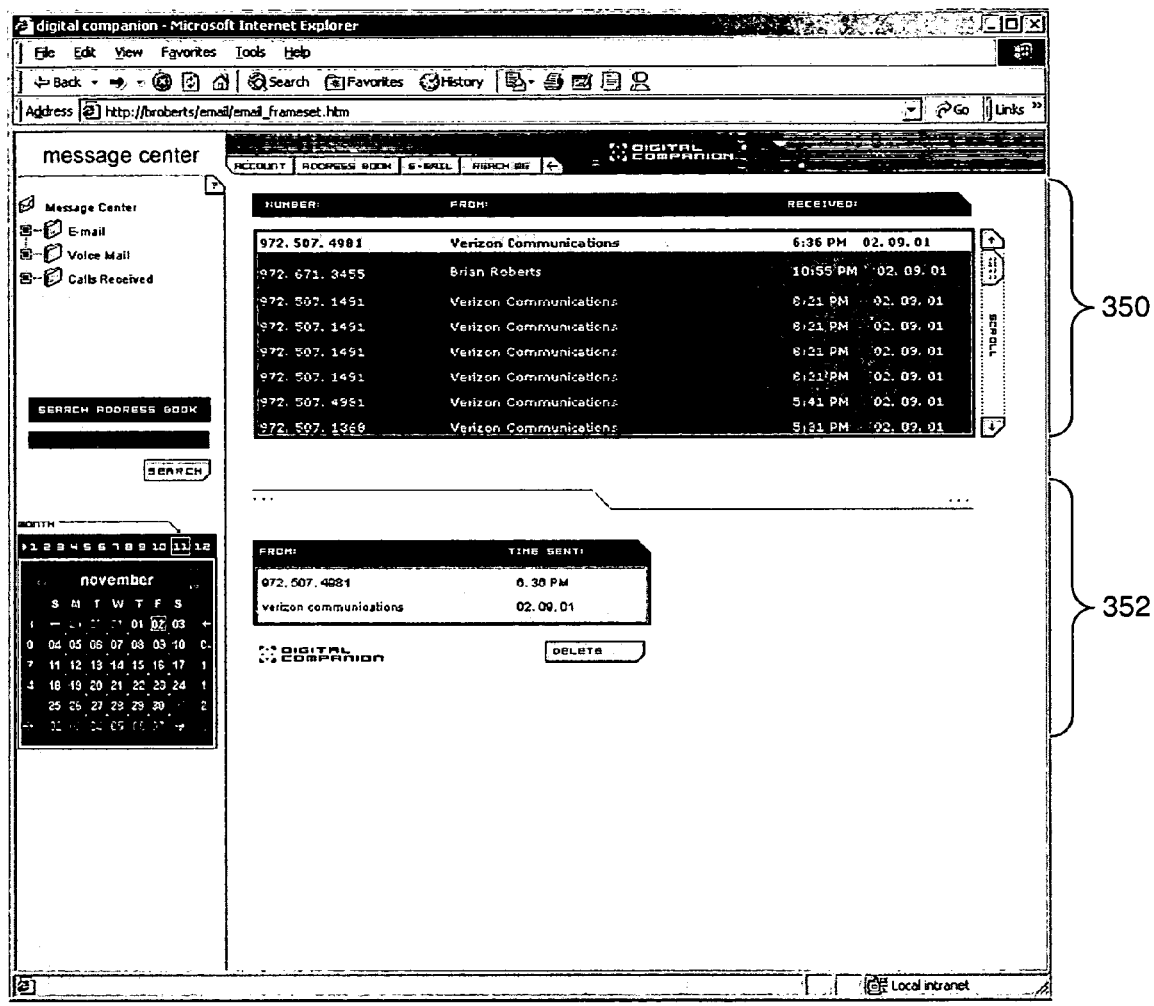
Figure 3I:
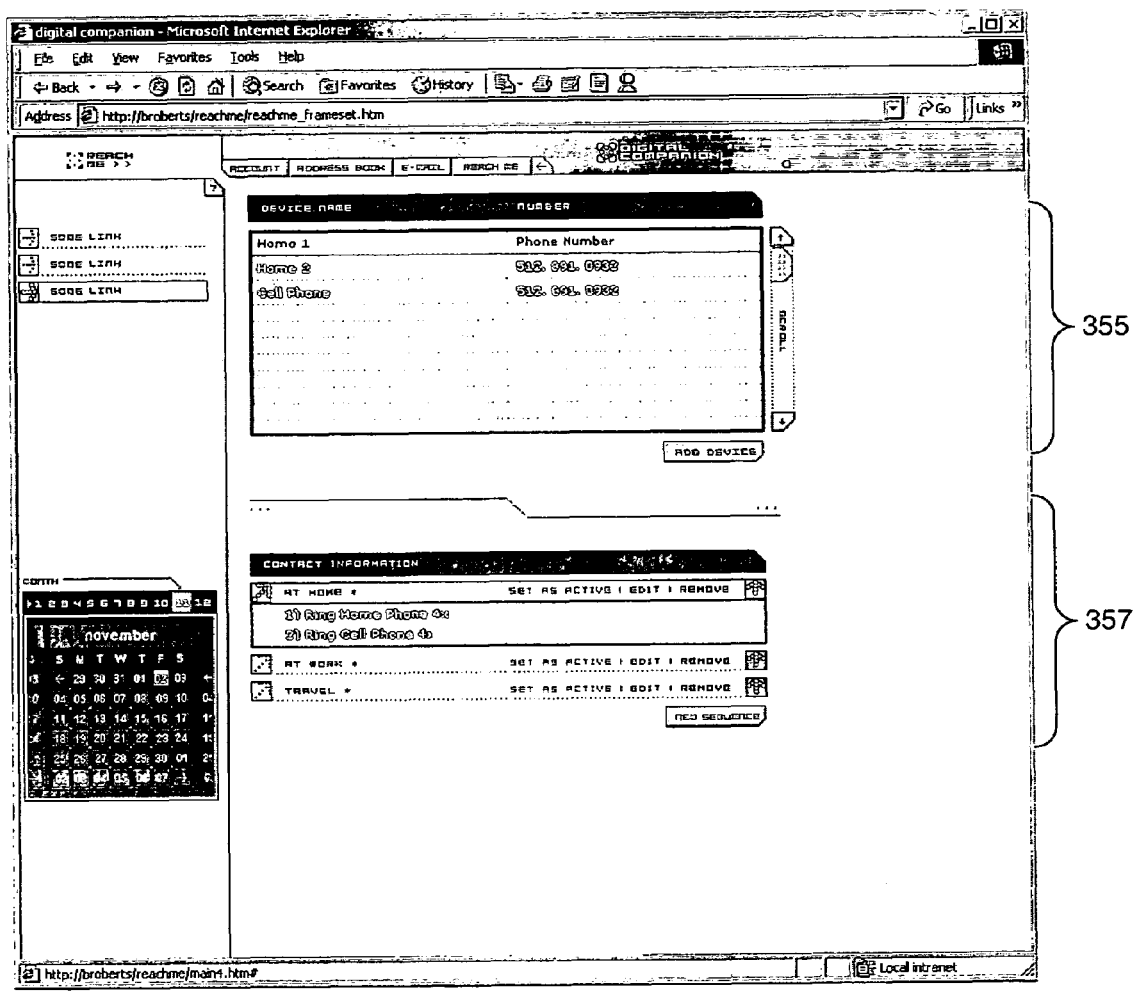

FIG. 3h shows a screen shot of a message center panel having a message summary list portion 350 that lists a summary of messages received. The screen shot also shows a message detail portion 352 that displays detail of a message. FIG. 3i shows a screen shot of a user interface having a device summary portion 355 that lists the devices in use by the user and a device detail portion 357 that allows the user to configure a particular device. For example, the user may configure the number of times to ring the "HOME 1" or "CELL PHONE" device.

Figure 3J:
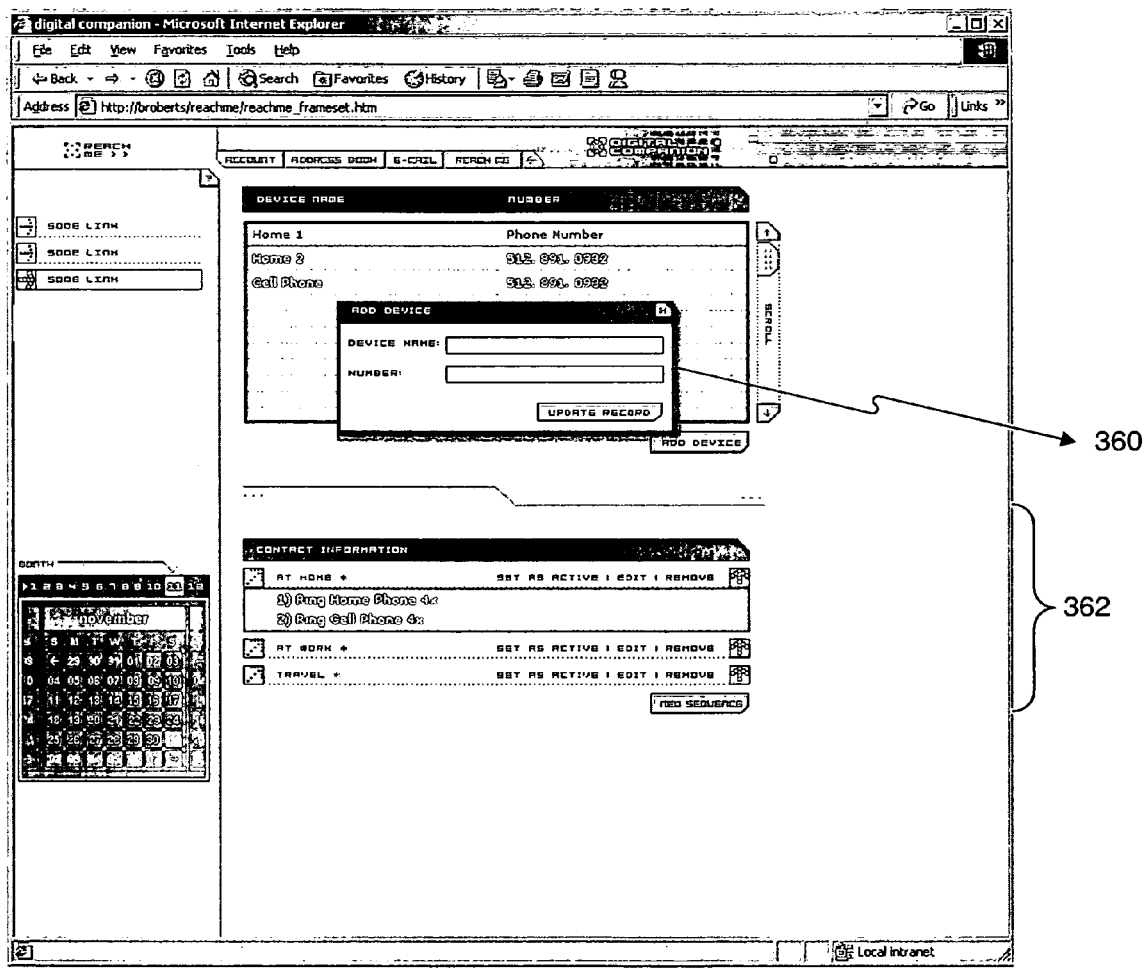
Figure 3K:
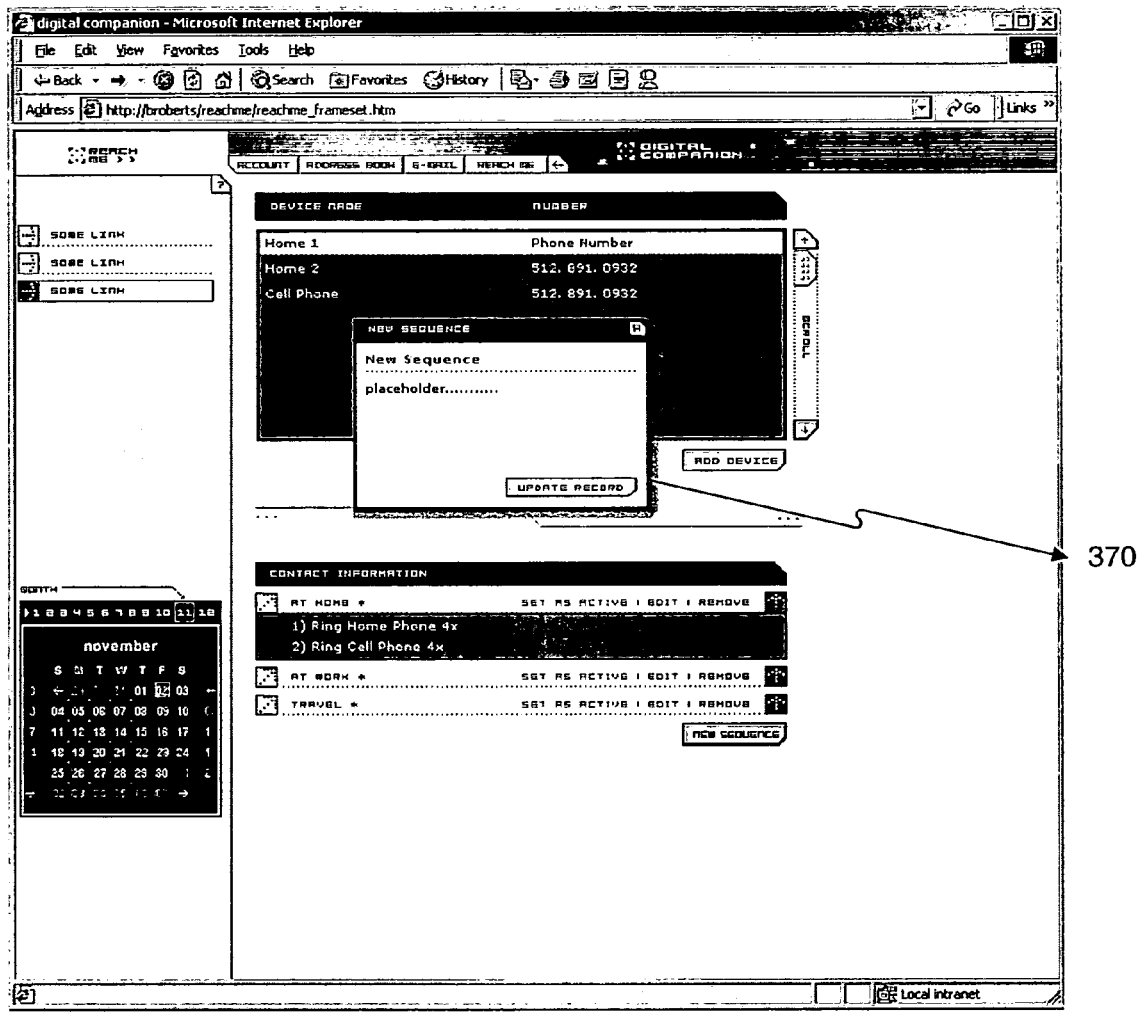

FIG. 3j shows a screen shot of the user interface of FIG. 3i having a pop-up window 360 for adding a device. The screen shot also shows a detail portion 362, which is similar to detail portion 357 of FIG. 3i. FIG. 3k shows a screen shot of the user interface of FIG. 3i having a pop-window 370 that provides an "UPDATE RECORD" option for a user to modify the sequence of devices being called.

Figure 3L:
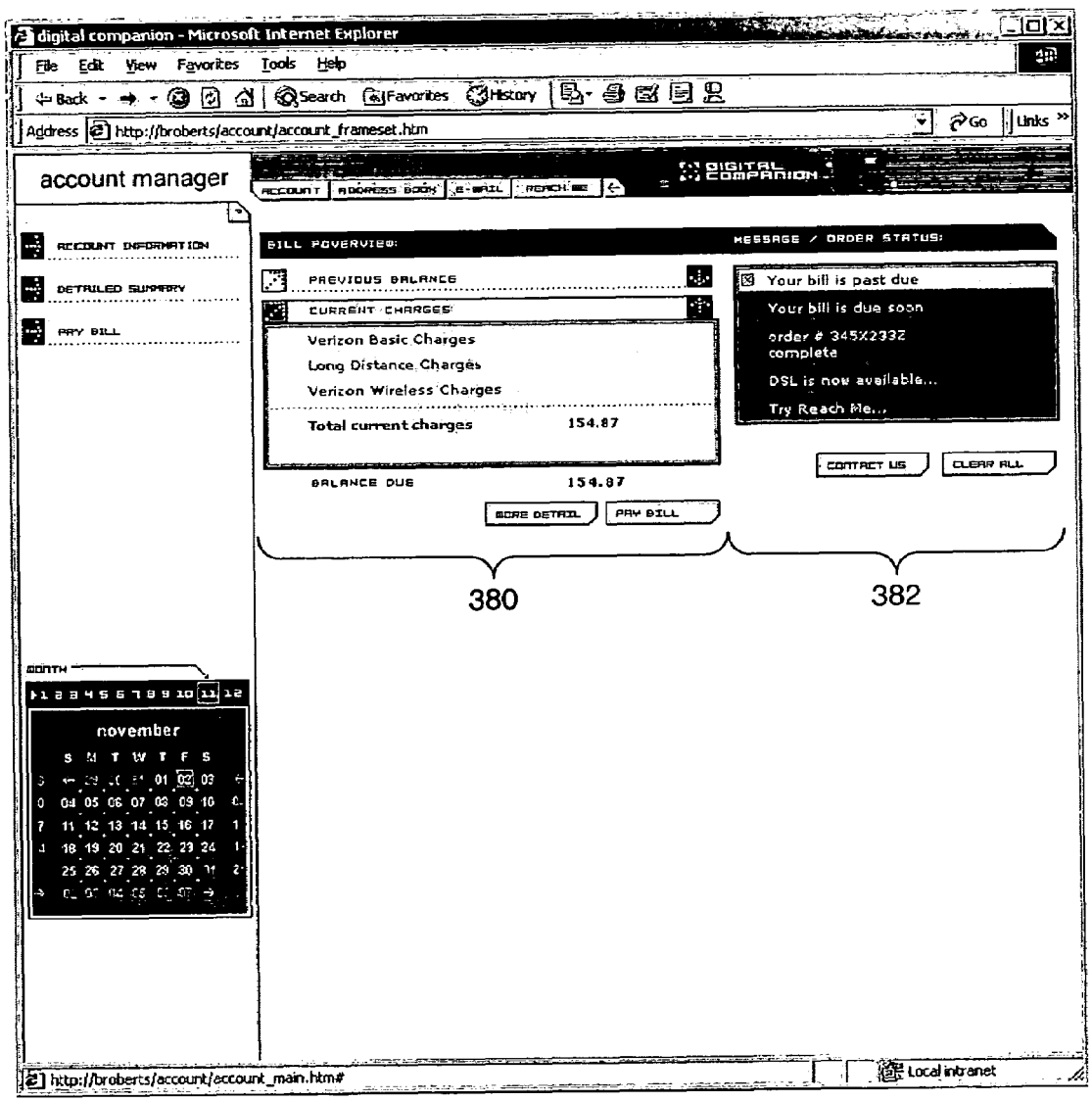

FIG. 3l shows a screen shot of a user interface for account management having an overview portion 380 allow a user access to summary information regarding a user's account. For example, overview portion 380 a user to access "PREVIOUS BALANCE", "CURRENT CHARGES", "BASIC CHARGES", "LONG DISTANCE CHARGES", and "WIRELESS CHARGES" summary information. The screen shot also shows a message portion 382 displays messages regarding the user's account. For example, a message such as "Your bill is past due" can be displayed in message portion 382.

Figure 3M:
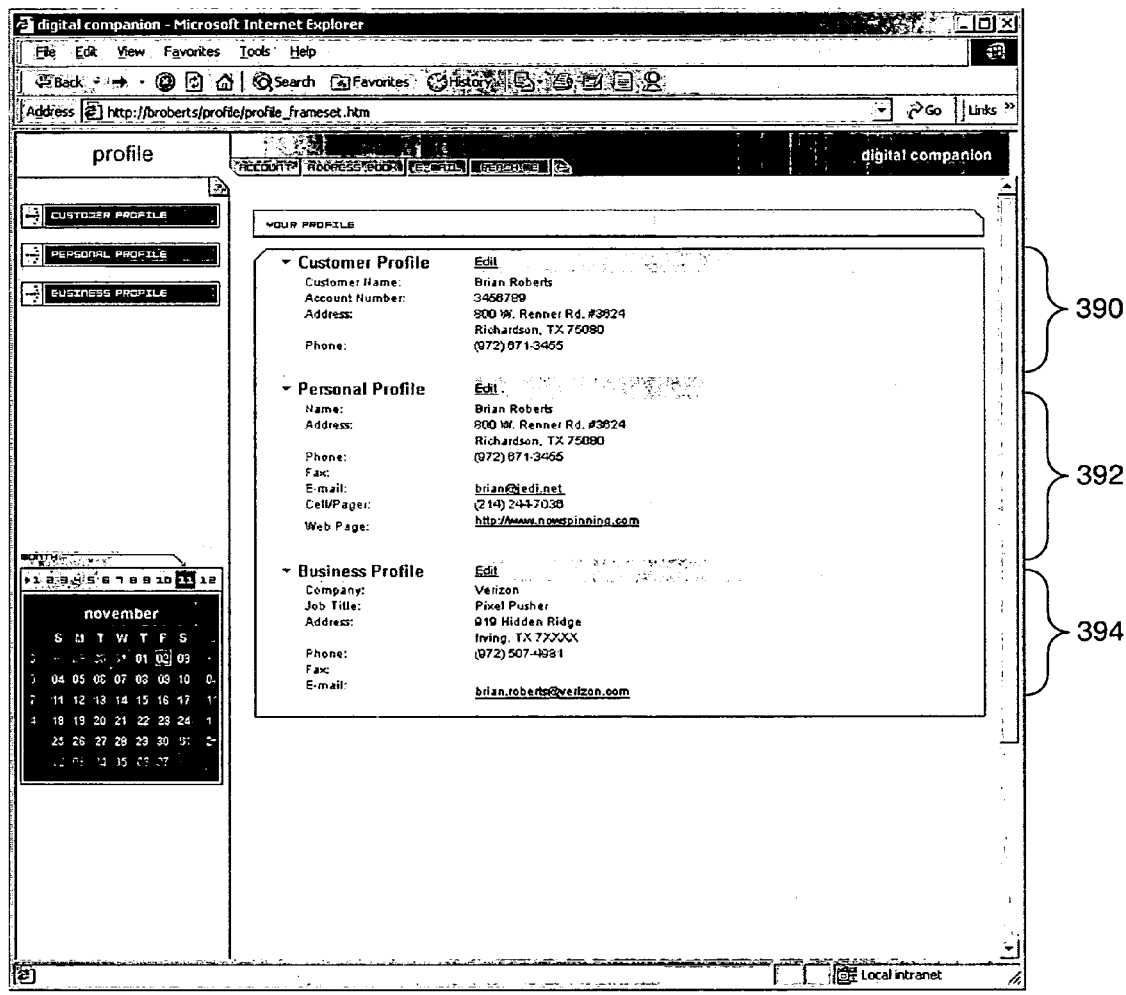

FIG. 3m shows a screen shot of a user interface for profile management having a customer profile portion 390, which displays a customer's profile. The customer's profile may include information such as "Customer Name:", "Account Number:", "Address" and "Phone:" information. The screen shot also shows a personal profile portion 392 that displays a user's personal profile. The personal profile may include "Name:", "Address", etc. information. The screen shot also shows a business profile portion 394 that displays a business profile. The business profile may include information such as "Company", "Job Title:" etc. information. These profiles can be kept confidential and updated to include any other type of profile information.

Figure 4A:
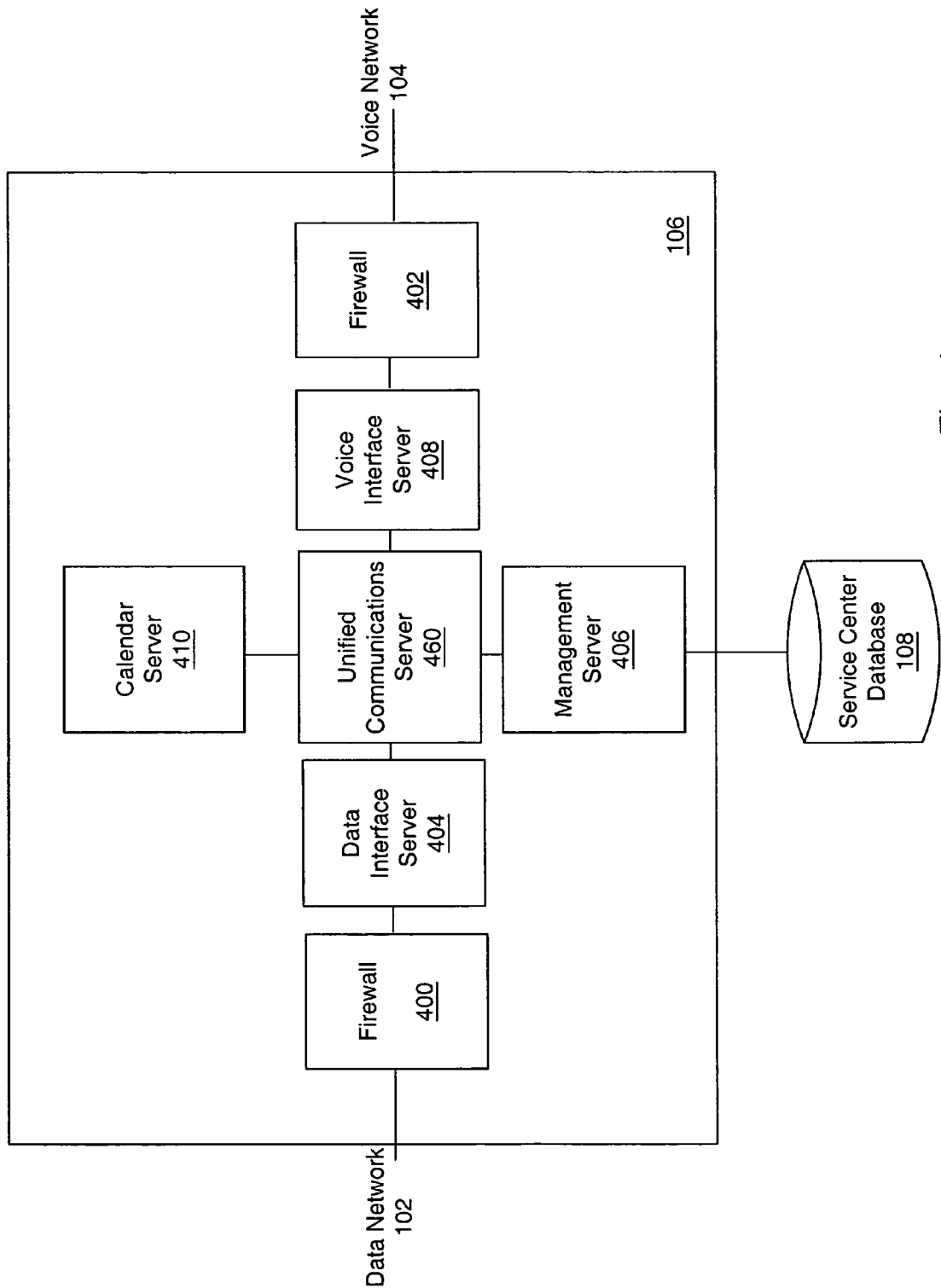
FIG. 4a is a block diagram of a service center, in accordance with methods and apparatus consistent with the principles of the present invention.

FIG. 4a is a block diagram of a service center, in accordance with methods and apparatus consistent with the principles of the present invention. As shown, service center 106 includes firewalls 400 and 402, a data interface server 404, a management server 406, a voice interface server 408, a calendar server 410, and unified communications server 460.

Firewalls 400 and 402 provide security services for communications between service center 106 and data network 102, and between service center 106 and voice network 104, respectively. For example, firewalls 400 and 402 may restrict communications between user terminal 112 and one or more servers within service center 106. Any security policy may be implemented in firewalls 400 and 402 consistent with the principles of the present invention. Firewalls 400 and 402 may be implemented using a combination of known hardware and software, such as the Raptor Firewall provided by the Axent Corporation. Furthermore, firewalls 400 and 402 may be implemented as separate machines within service center 106, or implemented on one or more machines external to service center 106.

Data interface server 404 provides interface services between service center 106 and user terminal 112. For example, data interface server 404 may exchange TCP/IP communications, such as IM communications or XML information which include call forwarding patterns from user 110. Data interface server 404 may also interface proxy 124 to indirectly exchange communications with user terminal 112.

Management server 406 controls operation of service center 106 and provides access services to service center database 108. For example, management server 406 may store information, such as call forwarding patterns, received from data interface server 404 into service center database 108. Management server 406 may also service queries to service center database 108, for example, from data interface server 404 or voice interface server 408.

Voice interface server 408 provides interface services between service center 106 and voice network 104. For example, voice interface server 408 may exchange information, such as call forwarding patterns, between service center database 108 and voice network 104. Voice interface server 408 may provide the information to voice network 104 using one or more protocols. For example, voice interface server 408 may use TCP/IP, or the Signaling System 7 ("SS7") protocol.

SS7 is a telecommunications protocol defined by the International Telecommunication Union ("ITU"). SS7 is an "out-of-band" signaling protocol using a system of nodes called Service Switching Points ("SSP"), Signal Transfer Points ("STP"), and Service Control Points ("SCP"). "Out-of-band signaling" is signaling that does not take place over the same path between switching elements as the connection, and instead uses separate digital channels between SS7 nodes. SS7 allows voice network 104 to provide enhanced functions, such as call forwarding; caller-ID; three-way calling; wireless services such as roaming and mobile subscriber authentication; local number portability; and toll-free/toll services.

Calendar server 410 provides services to calendar application 220 on user terminal 112. For example, calendar server 410 may provide email services, directory services, and calendar information, such as schedule information, to user terminal 112. Calendar server 410 may operate in conjunction with data interface server 404 to exchange, for example, call forwarding patterns with user terminal 112.

Although FIG. 4a shows separate servers within service center 106, service center 106 may be implemented using any combination of hardware and software. For example, service center 106 may implement data interface server 404, management server 406, voice interface server 408, calendar server 410 and unified communication server 460 as software applications installed on a single machine. In addition, service center 106 may access one or more servers remotely across a network.

Figure 4B:
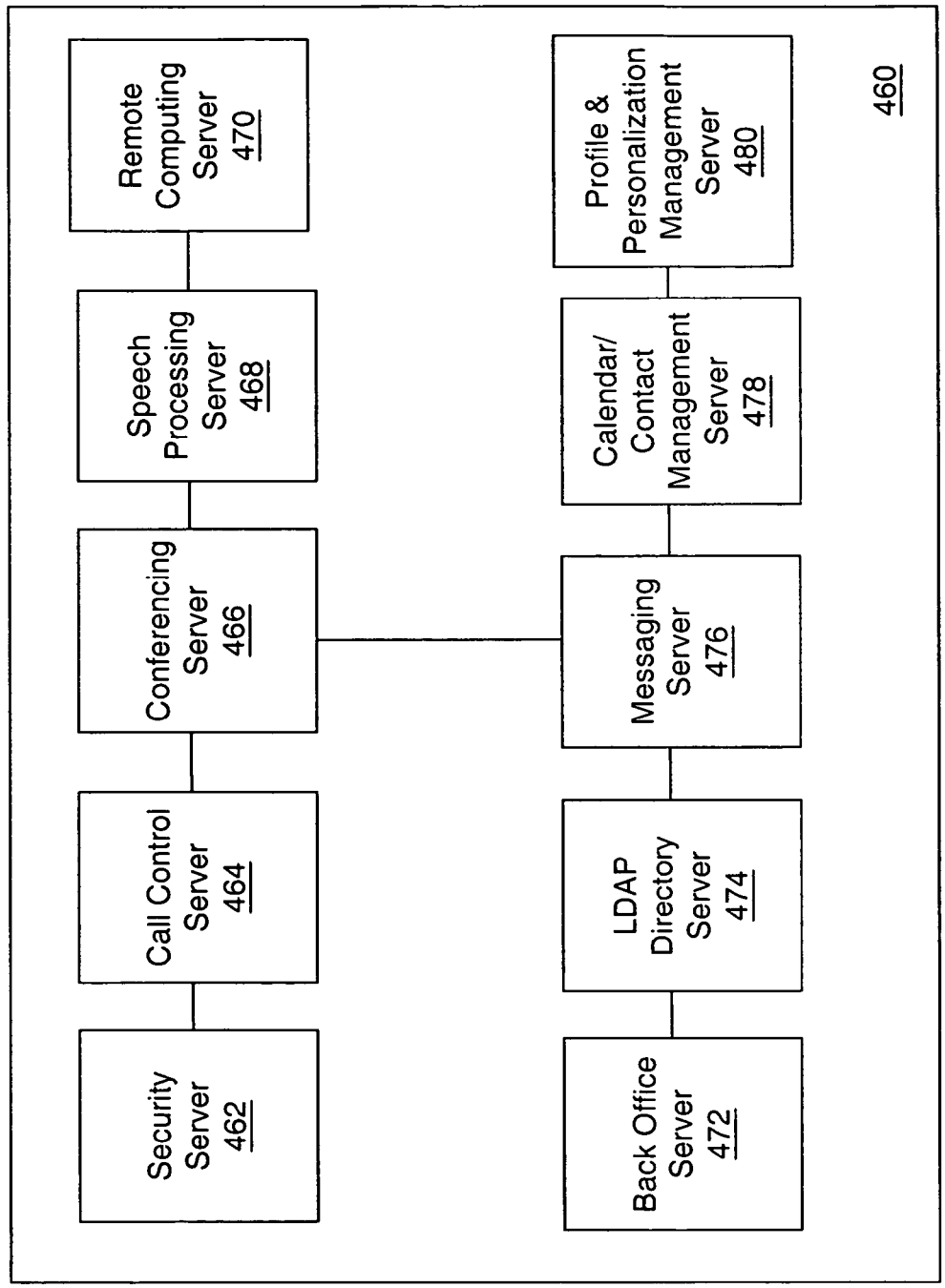

FIG. 4b is a detailed block diagram of the unified communications server 460, in accordance with methods and apparatus consistent with the principles of the present invention. As shown, unified communication server 460 includes a set of functional servers. The functional servers are a security server 462, a call control server 464, a conferencing server 466, a speech processing server 468, a remote computing server 470, a back office server 472, a LDAP directory server 474, a messaging server 476, calendar/contact management server 478 and profile and personalization management server 480.

Security server 462 can provide security checks on incoming calls, such as checking if the call is wanted or unwanted. Call control server 464 can control calls, performing actions such as call forwarding based on user set preferences. Conferencing server 466 can create conference calls by using a calendar-based system to notify a user 110 of a conference call and then making the call connections. Speech processing server 468 can perform speech processing, allowing a user to verbally communicate with the unified communication manager. Remote computing server 470 can manage and perform remote computing services. Back office server 472 can perform back office functions such as controlling billing and managing user profiles. LDAP directory server 474 can perform directory lookups by interfacing with SCP 600 and can be used for controlling the lookup of Caller-ID information in configuration database 614. Messaging server 476 can be an IM messaging server to control the sending of IM messages to the user terminal 112 of user 110. Calendar/contact management server 478 can be a set of calendaring software that manages all the calendared entries of the user 100. Profile and personalization management server 480 can perform the management and control of service center database 108 and initialing and updating user profile information.

Although FIG. 4b shows separate servers within unified communication server 460, unified communication server 460 may be implemented using any combination of hardware and software. For example, unified communication server 460 may implement a security server 462, a call control server 464, a conferencing server 466, a speech processing server 468, a remote computing server 470, a back office server 472, a LDAP directory server 474, a messaging server 476, calendar/contact management server 478 and profile and personalization management server 480 as software applications installed on a single machine. In addition, unified communication server 460 may access one or more servers remotely across a network.

FIG. 5a is an exemplary record table illustrating configuration information for a user, in accordance with methods and apparatus consistent with the principles of the present invention. As shown, record table 500 includes a device name column 502 and an address column 504. Record table 500 is stored at user terminal 112, such as in storage module 204, and service center database 108.

Device name column 502 includes information for identifying a particular device, such as phones 114, 116, and 118, or an email address, a pager number, or a voice mail box associated with user 110. User 110 may select any combination of text and numerals to identify a particular device. For example, user 110 may identify phone 114 as "Home," phone 116 as "Office,", and phone 118 as "Mobile." In addition, device name column 502 may include information selected by service center 106. For example, management server 406 may provide a proposed "default" name for a particular device.

FIG. 5b is an exemplary record table 506 illustrating rules and associated calendar data for forwarding communications, in accordance with methods and apparatus consistent with the principles of the present invention. As shown, record table 506 includes a pattern name column 508, a start date column 510, a start time column 512, an end data column 514, an end time column 516, a source identifier column 518, a destination identifier column 520, and a forwarding destination column 522. Table 506 is stored at user terminal 112, such as in storage module 204, and in service center database 108.

Pattern name column 508 includes information for identifying a particular forwarding pattern. User 110 may select any combination of text or numerals to identify a particular forwarding pattern. For example, user 110 may use "At Work" to identify a particular forwarding pattern for use during working hours, such as 9:00 AM to 5:00 PM. In addition, pattern name column 508 may include information selected by service center 106. For example, management server 406 may provide a default name for a particular forwarding pattern, such as "placeholder."

Start date column 510 and start time column 512 includes information indicating a start date and time for when a particular forwarding pattern is in effect. End date column 514 and end time column 516 includes information indicating an end date and time for when the particular forwarding pattern expires.

Source identifier column 518 includes information identifying a source of a communication, such as a telephone call. For example, source identifier column 518 may include the phone number for phone 122. Alternatively, source identifier column 518 may include information identifying calling party 120.

Destination identifier column 520 includes information identifying a destination of a communication, such as a telephone call. For example, destination identifier column 520 may include respective phone numbers for phones 114, 116, and 118.

Forwarding destination column 522 includes information identifying where a communication, such as a telephone call, is forwarded. For example, forwarding destination column 522 may indicate the phone number for phone 118 as a forwarding destination.

Figure 6:
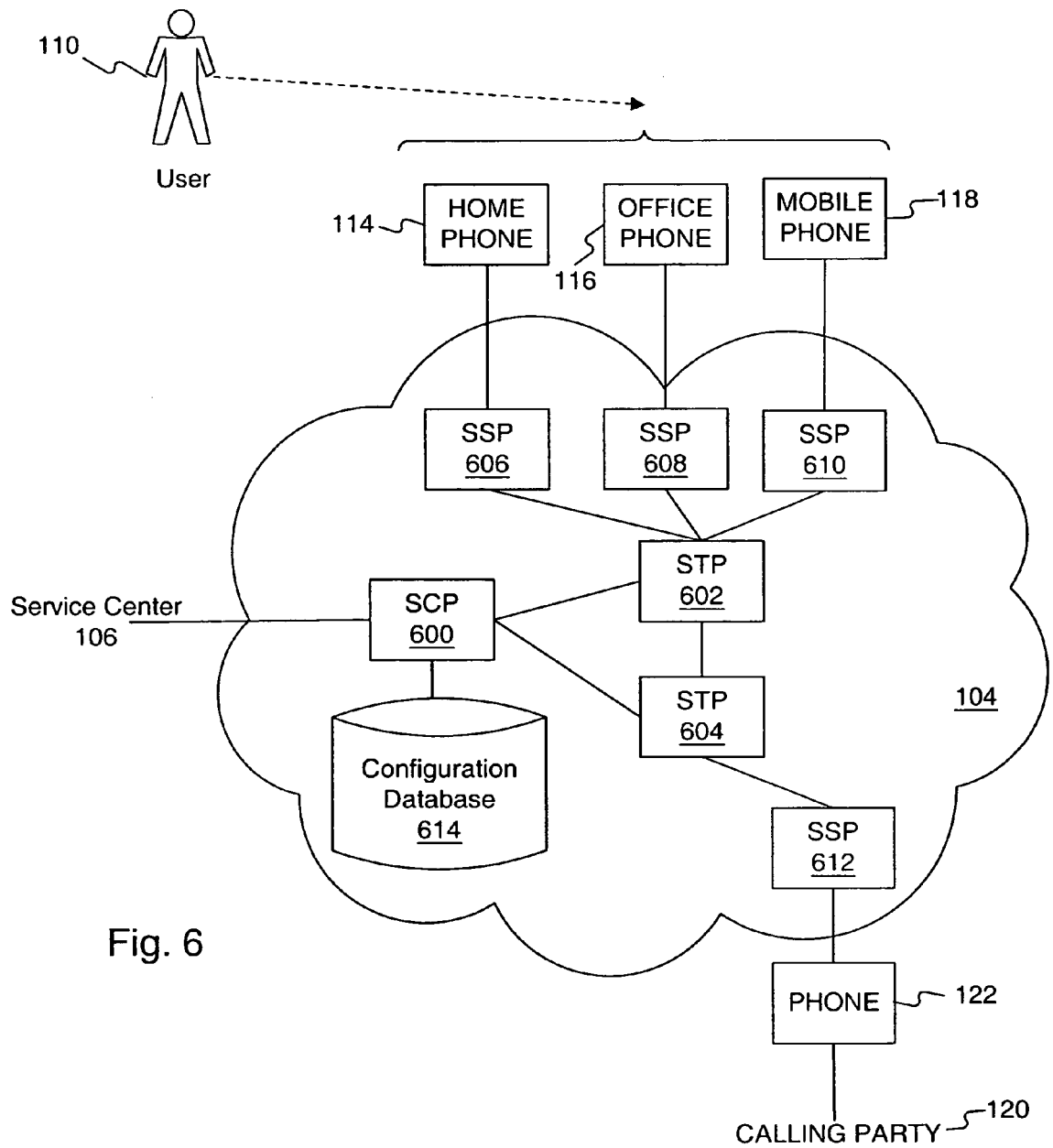
FIG. 6 is a block diagram of a voice network, in accordance with methods and apparatus consistent with the principles of the present invention.

FIG. 6 is a block diagram of a voice network, in accordance with methods and apparatus consistent with the principles of the present invention. As shown, voice network 104 includes a service control point ("SCP") 600, service transfer points ("STP") 602 and 604, service switching points ("SSP") 606, 608, 610, and 612, and a configuration database 614.

Voice network 104 may be implemented using the PSTN and SS7 as a signaling protocol. As noted above, the SS7 protocols allows voice network 104 to provide features, such as call forwarding; caller-ID; three-way calling; wireless services such as roaming and mobile subscriber authentication; local number portability; and toll-free/toll services. The SS7 protocol provides various types of messages to support the features of voice network 104. For example, these SS7 messages may include Transaction Capabilities Applications Part ("TCAP") messages to support event "triggers," and queries and responses between SCP 600 and SSPs 606, 608, 610, and 612.

SCP 600 provides interface services into configuration database 614 related to processing of calls within voice network 104, and interface services between voice interface server 408. SCP 600 provides translation and routing services of SS7 messages to support the features of voice network 104, such as call forwarding. In addition, SCP 600 may exchange information voice interface server 408 in service center 106 using TCP/IP or SS7. For example, SCP 600 may receive configuration information from voice interface terminal 408 which requests one or more call forwarding patterns in voice network 104. SCP 600 may then configure the call forwarding patterns in voice network 104 using one or more SS7 messages, such as TCAP messages, to set triggers in SSPs 606, 608, 610, and 612.

SCP 600 may be implemented using a combination of known hardware and software. Although SCP 600 is shown with a direct connection to service center 106, any number of network elements including routers, switches, hubs, etc. may be used to connect SCP 600 and service center 106.

STPs 602 and 604 relay SS7 messages within voice network 104. For example, STP 602 may route SS7 messages between SSPs 606, 608, 610, and 612. STP 602 and 604 may be integrated as adjunct to an SSP, e.g., SSPs 606, 608, 610, and 612, or may be implemented as a separate machine. In addition, STP 602 and 604 may provide security functions, such as security checks on incoming/outgoing SS7 messages. STP 602 may also provide other functions, such as acquisition and storage of traffic/usage statistics. STP 602 may be implemented using known hardware and software from manufacturers such as NORTEL™ and LUCENT Technologies™

SSPs 606, 608, 610, and 612 provide an interface between voice network 104 and phones 114, 116, 118, and 122, respectively, to setup, manage, and release telephone calls within voice network 104. SSPs 606, 608, 610, and 612 may be implemented as a voice switch, an SS7 switch, or a computer connected to a switch. SSPs 606, 608, 610, and 612 exchange SS7 signal units to support a telephone call between calling party 120 and user 110. For example, SSPs 606, 608, 610, and 612 may exchange SS7 messages, such as TCAP messages, within message signal units ("MSU") to control calls, perform database queries to configuration database 614, and provide maintenance information.

Configuration database 614 comprises one or more known databases to support the features of voice network 104. For example, configuration database 614 may include a call management service database; a line information database (LIDB); a business services database; a home location register; and a visitor location register.

Figure 7:
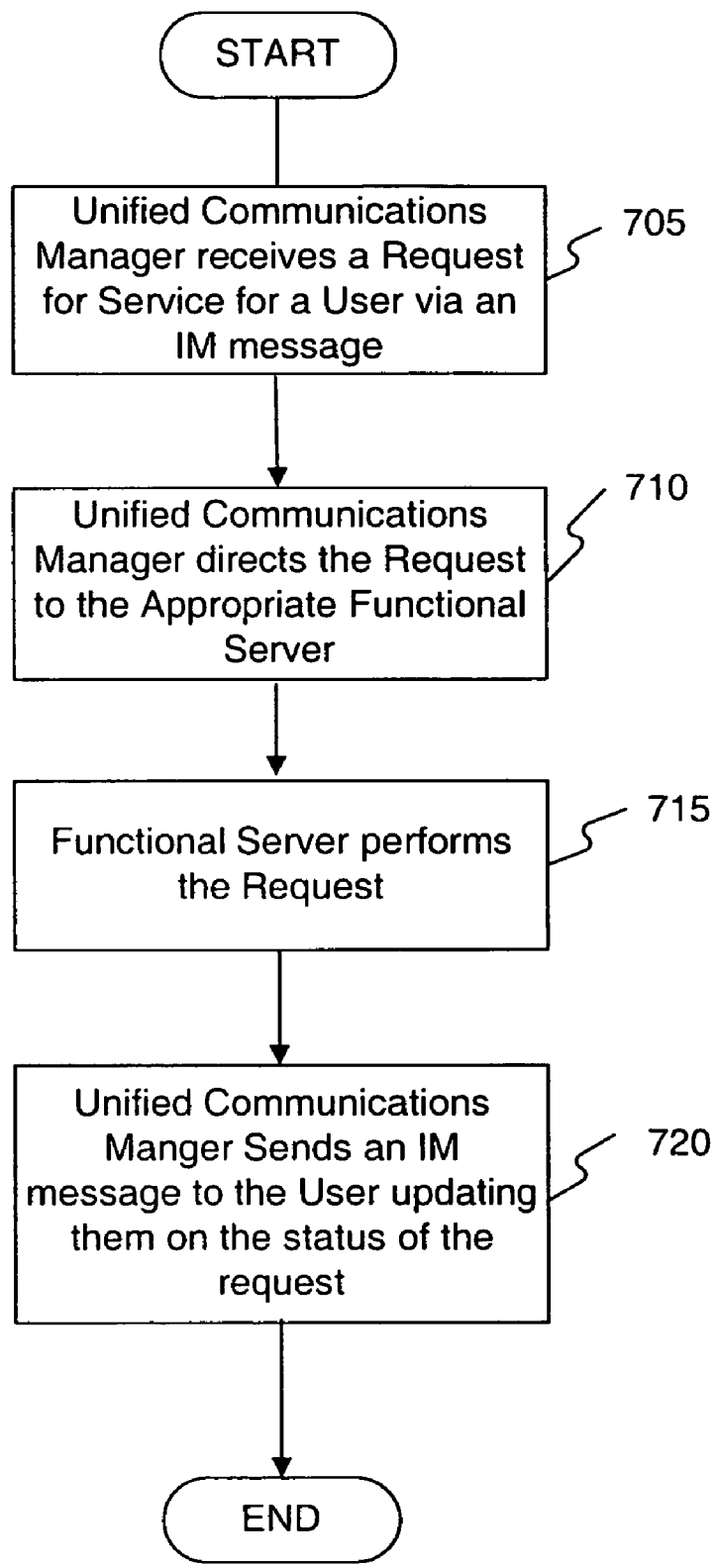
FIG. 7 is a flow diagram illustrating a method of providing unified communication management via instant messaging, in accordance with methods and apparatus consistent with the principles of the present invention.

FIG. 7 is a flow diagram illustrating a method of providing unified communication management via instant messaging, in accordance with methods and apparatus consistent with the principles of the present invention. The unified communications manager, i.e., unified communication server 460, receives a request for service from a user 110 in the form of an IM message (step 705). For example, user 110 may initiate an application, e.g., an installed IM client, on user terminal 112. In another example, user 110 may initiate the connection through phone 114 and via voice network 104.

The unified communications manager directs the request to the appropriate functional server (step 710). Examples of requests and functional server pairings include response to a request for call forwarding by call control server 464; responding to a request for a conference call by the conferencing server 466; responding to a request for a name lookup by LDAP directory server 474. One skilled in the art would also appreciate that the services performed may be performed by any number of servers for any number of types of requests.

The appropriate functional server performs the request (step 715). An example of performing a request include a functional server modifying a record in service center database 108 associated with user 110. Additionally, a functional server may request to SCP 600 to verify a voice mail notification service for user 110 at the phone number for phone 114. In another example, in response to the request, a functional server may verify Caller-ID service for user 110 at the phone number for phone 114. As yet another example, in response to the request, a functional server may send a request to SCP 600 to create a call forwarding service for user 110. Hence, whenever a call is attempted to phone 114, SCP 600 may cause the call to be forwarded, e.g., to another phone as specified by service center database 108. One skilled in the art would also appreciate that the services performed may be repeated for any number of devices or types of requests associated with user 110, including a wireless phone, a work phone number, etc.

The unified communications manager sends an IM message to user 110 updating them on the status of their request (step 720). The IM message may be sent to user terminal 112 via unified communications server 460 over data network 102.

Other embodiments of the invention will be apparent to those skilled in the art from consideration of the specification and practice of the invention disclosed herein. It is intended that the specification and examples be considered as exemplary only, with a true scope and spirit of the invention being indicated by the following claims.

What is claimed is:

1. A method for managing communication devices associated with a voice network and a data network using at least one unified communication manager and an instant messaging service, wherein the at least one unified communication manager is connected to both the voice network and the data network, the method performed by the unified communication manager comprising:

receiving a first instant message from a user through a real-time communication channel that is established by the instant messaging service and containing at least a request to set one or more rules for responding to a communication attempt to at least one of the communication devices;

setting the one or more rules based on information in the first instant message; and transmitting to the user, through the real-time communication channel, a second instant message containing a notification indicating the setting of the one or more rules of the at least one communication device;

wherein setting the one or more rules comprises
modifying the one or more rules based on the information in the first instant message;
storing the modified one or more rules in a storage in the data network and accessible to the unified communication manager; and
transmitting information based on the modified one or more rules to a control point in the voice network.

2. The method of claim 1, wherein transmitting to the user the second instant message comprises:
determining whether the user is currently connected to the instant messaging service; and
transmitting to the user the second instant message.

3. The method of claim 1, further comprising:
downloading to at least one of the communications devices associated with the user code for interfacing with the at least one unified communications manager.

4. A method for managing communication devices associated with a voice network and a data network using at least one unified communication manager and an instant messaging service, wherein the at least one unified communication manager is connected to both the voice network and the data network, the method performed by the unified communication manager comprising:

receiving a first instant message from a user through a real-time communication channel that is established by the instant messaging service and containing at least a request to set one or more rules for responding to a communication attempt to at least one of the communication devices;

setting the one or more rules based on information in the first instant message; and transmitting to the user, through the real-time communication channel, a second instant message containing a notification indicating the setting of the one or more rules of the at least one communication device;

wherein setting the one or more rules comprises
modifying the one or more rules based on the information in the first instant message;
storing the modified one or more rules in the data network and accessible by the unified communication manager.

5. The method of claim 4, wherein transmitting to the user the second instant message comprises:
determining whether the user is currently connected to the instant messaging service; and
transmitting to the user the second instant message.

6. The method of claim 4, further comprising:
downloading to at least one of the communications devices associated with the user code for interfacing with the at least one unified communications manager.

7. A computer readable medium capable of configuring a computer to perform a method of managing communication devices associated with a voice network and a data network using at least one unified communications manager and an instant messaging service, wherein the at least one unified communication manager is connected to both the voice network and the data network, the method performed by the unified communication manager comprising:

receiving a first instant message from a user through a real-time communication channel that is established by the instant messaging service and containing at least a request to set one or more rules for responding to a communication attempt to at least one of the communication devices;

setting the one or more rules based on information in the first instant message; and transmitting to the user, through the real-time communication channel, a second instant message containing a notification indicating the setting of the one or more rules;

wherein setting the one or more rules comprises
modifying the one or more rules based on the information in the first instant message;
storing the modified one or more rules in a storage in the data network and accessible to the unified communication manager; and
transmitting information based on the modified one or more rules to the voice network.

8. The computer readable medium of claim 7, wherein transmitting to the user the second instant message comprises:
determining whether the user is currently connected to the instant messaging service; and
transmitting to the user the second instant message.

9. The computer readable medium of claim 7, wherein the method further comprises:
downloading to at least one of the communications devices associated with the user code for interfacing with the at least one unified communications manager.

10. A computer readable medium capable of configuring a computer to perform a method of managing communication devices associated with a voice network and a data network using at least one unified communications manager and an instant messaging service, wherein the at least one unified communication manager is connected to both the voice network and the data network, the method performed by the unified communication manager comprising:

receiving a first instant message from a user through a real-time communication channel that is established by the instant messaging service and containing at least a request to set one or more rules for responding to a communication attempt to at least one of the communication devices;

setting the one or more rules based on information in the first instant message; and transmitting to the user, through the real-time communication channel, a second instant message containing a notification indicating the setting of the one or more rules;

wherein setting the one or more rules comprises
modifying the one or more rules based on the information in the first instant message; and
storing the modified one or more rules in a storage in the data network and accessible to the unified communication manager.

11. The computer readable medium of claim 10, wherein transmitting to the user the second instant message comprises:
   determining whether the user is currently connected to the instant messaging service; and
   transmitting to the user the second instant message.

12. The computer readable medium of claim 10, wherein the method further comprises:
   downloading to at least one of the communications devices associated with the user code for interfacing with the at least one unified communications manager.

13. An apparatus for managing communication devices associated with a voice network and a data network using at least one unified communication manager and an instant messaging service, wherein the at least one unified communication manager is connected to both the voice network and the data network, the unified communication manager comprising:
   means for receiving a first instant message from a user through a real-time communication channel that is established by the instant messaging service and containing at least a request to set one or more rules for responding to a communication attempt to at least one of the communication devices;
   means for setting the one or more rules based on information in the first instant message; and
   means for transmitting to the user, through the real-time communication channel, a second instant message containing a notification indicating the setting of the one or more rules;
   wherein the means for setting the one or more rules is configured to
      modify the one or more rules based on the information in the first instant message;
      store the modified one or more rules in a storage in the data network and accessible to the unified communication manager; and
      transmit information based on the modified one or more rules to the voice network.

14. The apparatus of claim 13, wherein the means for transmitting to the user the second instant message comprises:
   means for determining whether the user is currently connected to the instant messaging service; and
   means for transmitting to the user the second instant message.

15. The apparatus of claim 13, further comprising:
   means for downloading to at least one of the communications devices associated with the user code for interfacing with the at least one unified communications manager.

16. An apparatus for managing communication devices associated with a voice network and a data network using at least one unified communication manager and an instant messaging service, wherein the at least one unified communication manager is connected to both the voice network and the data network, the unified communication manager comprising:
   means for receiving a first instant message from a user through a real-time communication channel that is established by the instant messaging service and containing at least a request to set one or more rules for responding to a communication attempt to at least one of the communication devices;
   means for setting the one or more rules based on information in the first instant message; and
   means for transmitting to the user, through the real-time communication channel, a second instant message containing a notification indicating the setting of the one or more rules;
   wherein the means for setting the one or more rules is configured to
      modify the one or more rules based on the information in the first instant message; and
      store the modified one or more rules in a storage in the data network and accessible to the unified communication manager.

17. The apparatus of claim 16, wherein the means for transmitting to the user the second instant message comprises:
   means for determining whether the user is currently connected to the instant messaging service; and
   means for transmitting to the user the second instant message.

18. The apparatus of claim 16, further comprising:
   means for downloading to at least one of the communications devices associated with the user code for interfacing with the at least one unified communications manager.

* * * * *